(12) United States Patent
Jeon et al.

(10) Patent No.: US 12,734,578 B2
(45) **Date of Patent: *Sep. 15, 2026**

(54) NICKEL-BASED SUPERALLOY MIXED POWDER HAVING ZIRCONIA FOR DIRECTED ENERGY DEPOSITION, NICKEL-BASED SUPERALLOY DIRECTED ENERGY DEPOSITION STRUCTURE AND METHOD OF MANUFACTURING THE SAME

(71) Applicant: DONG-A UNIVERSITY RESEARCH FOUNDATION FOR INDUSTRY-ACADEMY COOPERATION, Busan (KR)

(72) Inventors: Jong Bae Jeon, Busan (KR); Deok Hyun Jo, Busan (KR); Jae Jun Lee, Busan (KR); Hak Sung Lee, Busan (KR); Geon Woo Park, Yangsan-si (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 8 days.

This patent is subject to a terminal disclaimer.

(21) Appl. No.: 19/042,670

(22) Filed: Jan. 31, 2025

(65) Prior Publication Data

US 2025/0256329 A1 Aug. 14, 2025

(30) Foreign Application Priority Data

Feb. 8, 2024 (KR) ........................ 10-2024-0019798
Feb. 8, 2024 (KR) ........................ 10-2024-0019799

(51) Int. Cl.
*B22F 1/12* (2022.01)
*B22F 1/052* (2022.01)
(Continued)

(52) U.S. Cl.
CPC ................ *B22F 1/12* (2022.01); *B22F 1/052* (2022.01); *B33Y 70/10* (2020.01); *B22F 10/25* (2021.01);
(Continued)

(58) Field of Classification Search
None
See application file for complete search history.

(56) References Cited

U.S. PATENT DOCUMENTS

| | | | |
|---|---|---|---|
| 11,342,557 | B2 | 5/2022 | Jo et al. |
| 2016/0158839 | A1 | 6/2016 | Piascik et al. |
| 2023/0127550 | A1 | 4/2023 | Nuechterlein et al. |

FOREIGN PATENT DOCUMENTS

KR 10-2596885 B1 10/2023

OTHER PUBLICATIONS

Ghosi et al., "Development of Yttria-stabilized zirconia reinforced Inconel 625 metal matrix composite by laser powder bed fusion", 2021, Materials Science & Engineering A, vol. 827, 142037 (12 pages). (Year: 2021).*

(Continued)

*Primary Examiner* — Kim S. Horger
(74) *Attorney, Agent, or Firm* — Bridgeway IP Law Group, PLLC; Sang Ho Lee; Hyun Woo Shin

(57) ABSTRACT

Provided is a nickel-based superalloy mixed powder having zirconia for directed energy deposition, a zirconia contained nickel-based superalloy directed energy deposition structure having uniform microstructure and excellent hardness and a method for manufacturing the same. The method of manufacturing the zirconia contained nickel-based superalloy directed energy deposition structure includes, providing a nickel-based superalloy powder having a first average particle size; providing a zirconia powder having a second average particle size smaller than the first average particle (Continued)

size; forming a mixed powder by mixing the nickel-based superalloy powder and the zirconia powder; and forming nickel-based superalloy directed energy deposition structure by performing directed energy deposition with the mixed powder using a laser.

19 Claims, 21 Drawing Sheets

(51) Int. Cl.

| | |
|---|---|
| ***B33Y 70/10*** | (2020.01) |
| *B22F 10/25* | (2021.01) |
| *B33Y 10/00* | (2015.01) |

(52) U.S. Cl.
CPC ....... *B22F 2301/15* (2013.01); *B22F 2302/25* (2013.01); *B22F 2304/054* (2013.01); *B22F 2304/056* (2013.01); *B22F 2304/10* (2013.01); *B33Y 10/00* (2014.12)

(56) References Cited

OTHER PUBLICATIONS

An, Jinoop et al., "Laser-assisted directed energy deposition of nickel super alloys: A review", Proceedings of the Institution of Mechanical Engineers, Part L: Journal of Materials: Design and Applications, 2019, vol. 233, No. 11, pp. 2376-2400. doi: 10.1177/1464420719852658.

* cited by examiner

Nickel-based Superalloy Powder 20 nm Zirconia Powder 200 nm Zirconia Powder

Ball Milling Mixed Powder

Swing Planetary Mixed Powder

FIG. 5

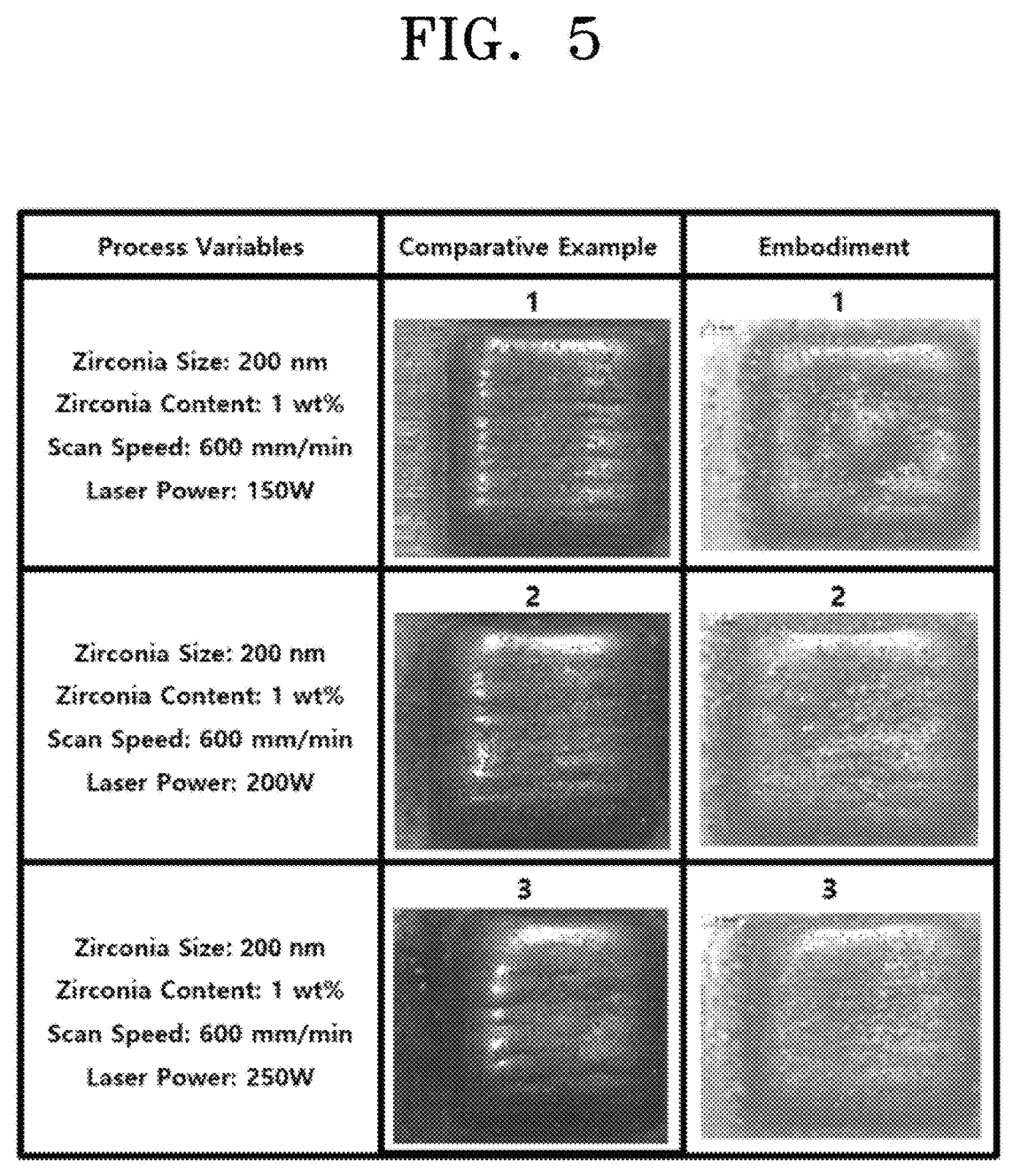

| Process Variables | Comparative Example | Embodiment |
|---|---|---|
| Zirconia Size: 200 nm<br>Zirconia Content: 1 wt%<br>Scan Speed: 600 mm/min<br>Laser Power: 150W | 1 | 1 |
| Zirconia Size: 200 nm<br>Zirconia Content: 1 wt%<br>Scan Speed: 600 mm/min<br>Laser Power: 200W | 2 | 2 |
| Zirconia Size: 200 nm<br>Zirconia Content: 1 wt%<br>Scan Speed: 600 mm/min<br>Laser Power: 250W | 3 | 3 |

FIG. 6

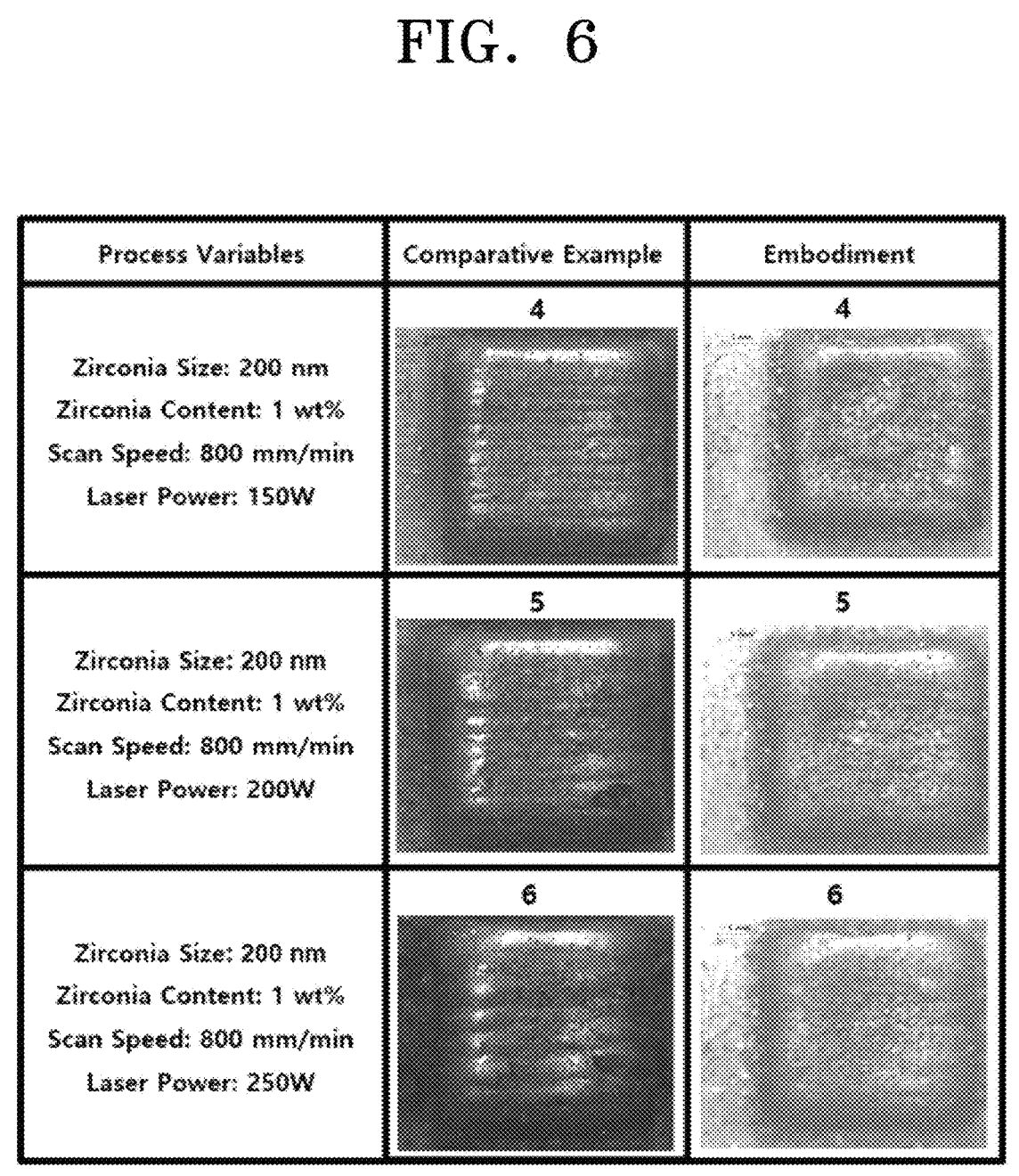

| Process Variables | Comparative Example | Embodiment |
| --- | --- | --- |
| Zirconia Size: 200 nm<br>Zirconia Content: 1 wt%<br>Scan Speed: 800 mm/min<br>Laser Power: 150W | 4 | 4 |
| Zirconia Size: 200 nm<br>Zirconia Content: 1 wt%<br>Scan Speed: 800 mm/min<br>Laser Power: 200W | 5 | 5 |
| Zirconia Size: 200 nm<br>Zirconia Content: 1 wt%<br>Scan Speed: 800 mm/min<br>Laser Power: 250W | 6 | 6 |

FIG. 7

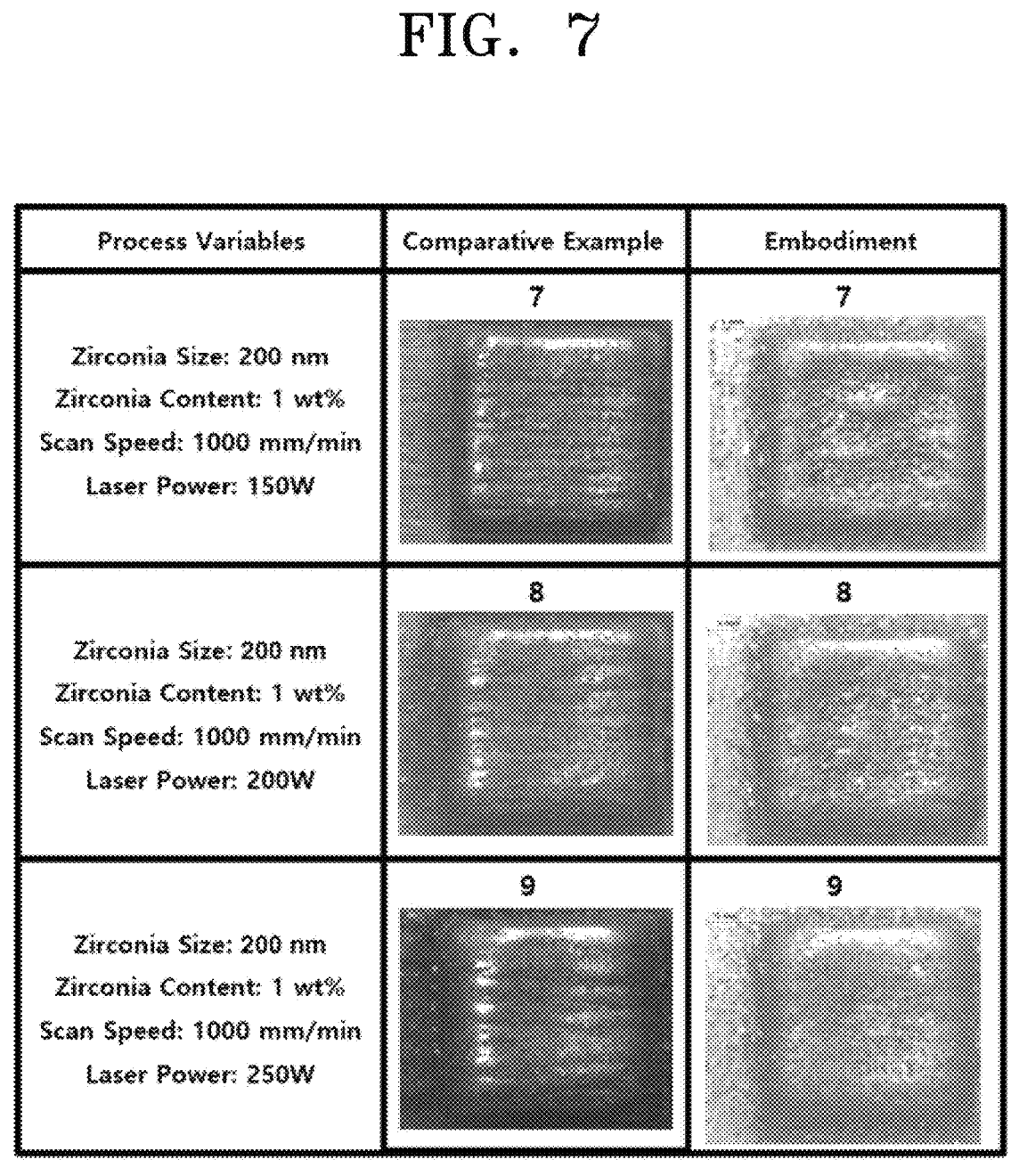

| Process Variables | Comparative Example | Embodiment |
| --- | --- | --- |
| Zirconia Size: 200 nm<br>Zirconia Content: 1 wt%<br>Scan Speed: 1000 mm/min<br>Laser Power: 150W | 7 | 7 |
| Zirconia Size: 200 nm<br>Zirconia Content: 1 wt%<br>Scan Speed: 1000 mm/min<br>Laser Power: 200W | 8 | 8 |
| Zirconia Size: 200 nm<br>Zirconia Content: 1 wt%<br>Scan Speed: 1000 mm/min<br>Laser Power: 250W | 9 | 9 |

FIG. 8

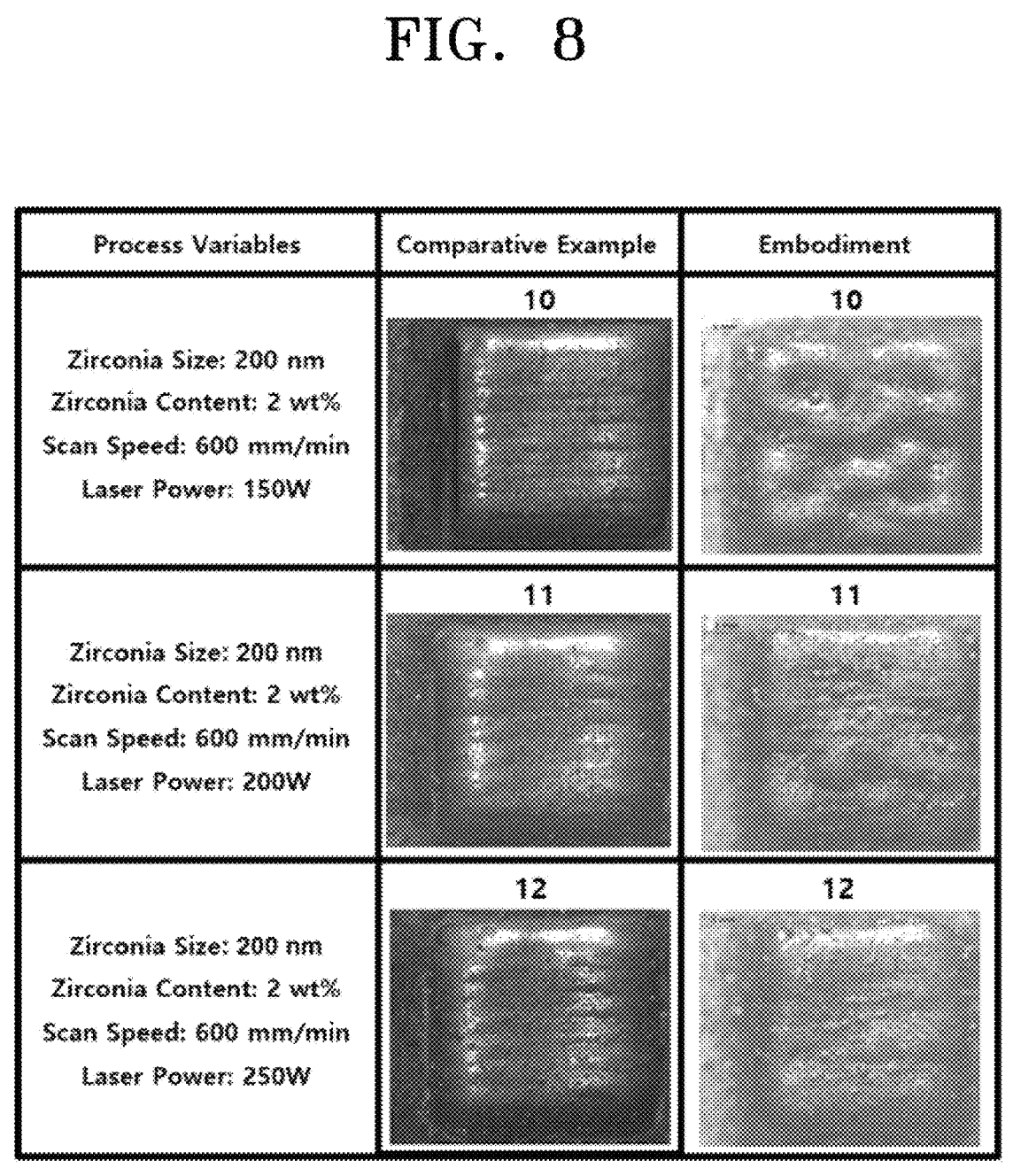

| Process Variables | Comparative Example | Embodiment |
|---|---|---|
| Zirconia Size: 200 nm<br>Zirconia Content: 2 wt%<br>Scan Speed: 600 mm/min<br>Laser Power: 150W | 10 | 10 |
| Zirconia Size: 200 nm<br>Zirconia Content: 2 wt%<br>Scan Speed: 600 mm/min<br>Laser Power: 200W | 11 | 11 |
| Zirconia Size: 200 nm<br>Zirconia Content: 2 wt%<br>Scan Speed: 600 mm/min<br>Laser Power: 250W | 12 | 12 |

FIG. 9

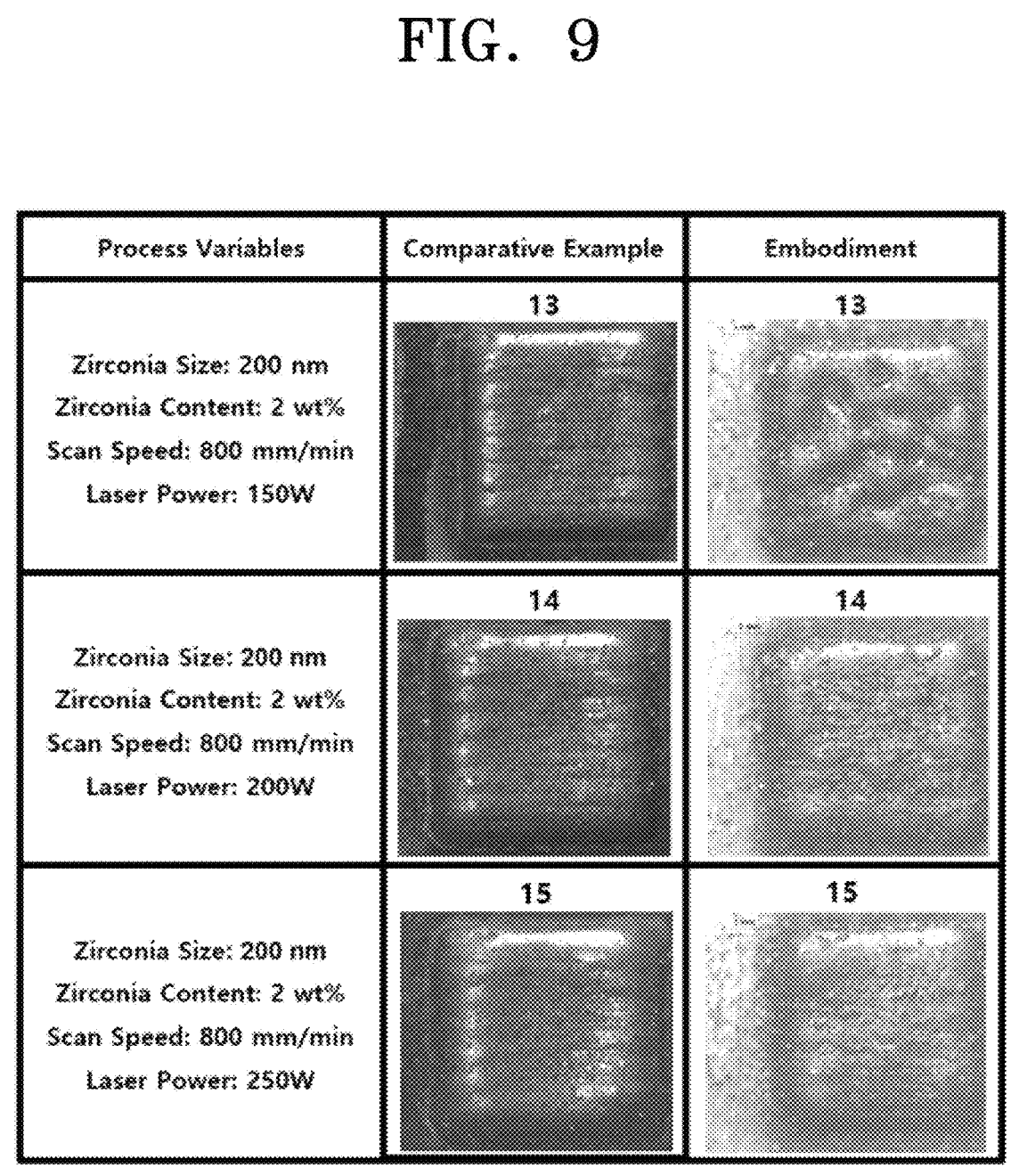

| Process Variables | Comparative Example | Embodiment |
|---|---|---|
| Zirconia Size: 200 nm<br>Zirconia Content: 2 wt%<br>Scan Speed: 800 mm/min<br>Laser Power: 150W | 13 | 13 |
| Zirconia Size: 200 nm<br>Zirconia Content: 2 wt%<br>Scan Speed: 800 mm/min<br>Laser Power: 200W | 14 | 14 |
| Zirconia Size: 200 nm<br>Zirconia Content: 2 wt%<br>Scan Speed: 800 mm/min<br>Laser Power: 250W | 15 | 15 |

FIG. 10

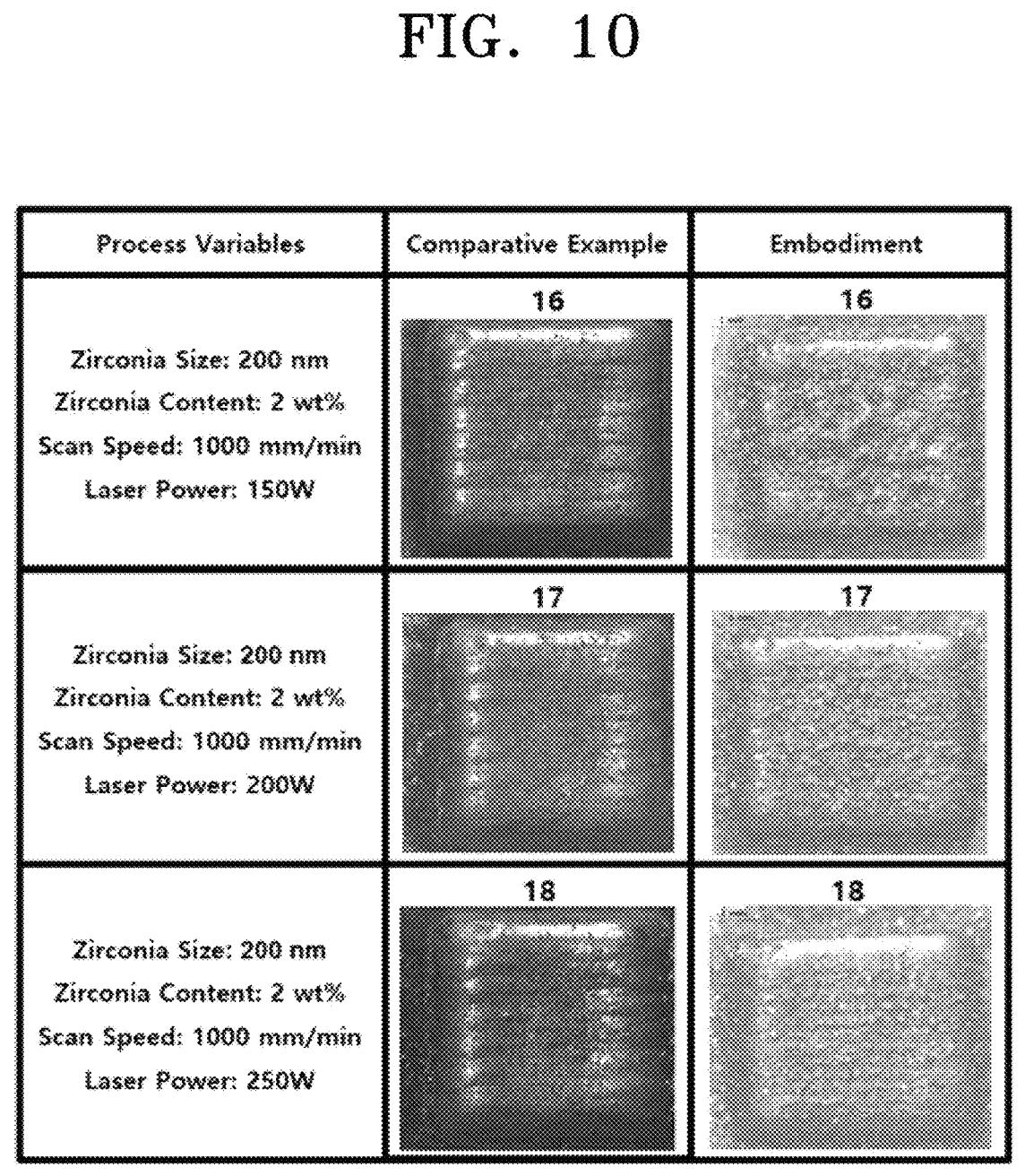

| Process Variables | Comparative Example | Embodiment |
| --- | --- | --- |
| Zirconia Size: 200 nm<br>Zirconia Content: 2 wt%<br>Scan Speed: 1000 mm/min<br>Laser Power: 150W | 16 | 16 |
| Zirconia Size: 200 nm<br>Zirconia Content: 2 wt%<br>Scan Speed: 1000 mm/min<br>Laser Power: 200W | 17 | 17 |
| Zirconia Size: 200 nm<br>Zirconia Content: 2 wt%<br>Scan Speed: 1000 mm/min<br>Laser Power: 250W | 18 | 18 |

NICKEL-BASED SUPERALLOY MIXED POWDER HAVING ZIRCONIA FOR DIRECTED ENERGY DEPOSITION, NICKEL-BASED SUPERALLOY DIRECTED ENERGY DEPOSITION STRUCTURE AND METHOD OF MANUFACTURING THE SAME

CROSS-REFERENCE TO RELATED PATENT APPLICATION

This application claims the benefit of Korean Patent Applications No. 10-2024-0019798, filed on Feb. 8, 2024, and No. 10-2024-0019799, filed on Feb. 8, 2024, in the Korean Intellectual Property Office, the disclosures of which are incorporated herein in their entirety by reference.

BACKGROUND OF THE INVENTION

1. Field of the Invention

The present invention relates to a nickel-based superalloy structure, and more particularly, to nickel-based superalloy mixed powder having zirconia for directed energy deposition, to form a deposition structure with uniform microstructure and high hardness, a nickel-based superalloy directed energy deposition structure and a method of manufacturing the same.

The present invention is proposed with reference to Development of localized manufacturing technology of metal powder for HRC grade 60 mold steel and dissimilar metal additive manufacturing technology for high strength material molding, No. 1415186063 (20011279) supported by the Korea Institute for Advancement of Technology (KEIT), granted financial resource from the Ministry of Trade, Industry and Energy, Republic of Korea, to Hydrogen Industry Convergence Components Manufacturing and Design Professional Training Group, No. 1425177902 (00256880) supported by the Korea Technology and Information Promotion Agency for Small and Medium Enterprises (TIPA), granted financial resource from the Ministry of Small and Medium Enterprises and Startups, Republic of Korea, and to Establishment of an aerospace superalloys HUB with materials database-driven artificial intelligence technology, No. 2710018197 (00451579) supported by the National Research Foundation of Korea from the Ministry of Science and ICT, Republic of Korea.

2. Description of the Related Art

Directed energy deposition (DED) three-dimensional printing is a technology that creates three-dimensional shape as digital design data through computer modeling, differentiates it into a two-dimensional plane, prints the differentiated material on the plane using a three-dimensional printer, and continues to stack the printed data layer-by-layer to create a three-dimensional product. The directed energy deposition, which is applied to form metal structures, creates final products by spraying metal powder onto a base material, melting the base material and the metal powder simultaneously and attaching and depositing them one layer at a time. In the directed energy deposition process, while applying high-power laser, metal powder is simultaneously sprayed around the laser, thereby melting and solidifying the metal powder to form a two-dimensional metal layer. Then, the metal layer is melted by a continuously applied laser, and a metal powder sprayed is simultaneously melted, thereby continuously overlaying single layers on the metal layer. This process is repeatedly performed to produce a three-dimensional stacked structure. Therefore, in the directed energy deposition method, process variables can be controlled in real time.

However, the directed energy deposition method may cause grain coarsening of the deposition structure due to the high heat input by the laser. When grains of the deposition structure are coarsened, it will have a negative effect on properties such as tensile property, creep strength, and fracture toughness. In addition, coarsened grains may result in a strong aggregate structure of crystal orientation, causing anisotropy in mechanical properties. Therefore, it is necessary to minimize porosity and refine the grain structure.

SUMMARY OF THE INVENTION

The present invention provides nickel-based superalloy mixed powder having zirconia for directed energy deposition, to prevent grain coarsening and texture forming and to form a deposition structure having low porosity, uniform microstructure, and high hardness, a nickel-based superalloy directed energy deposition structure and a method of manufacturing the same.

However, the above description is an example, and the scope of the present invention is not limited thereto.

According to one aspect of the present invention, there is provided a nickel-based superalloy mixed power having zirconia for directed energy deposition, to form a deposition structure having low porosity, uniform microstructure, and high hardness, a nickel-based superalloy directed energy deposition structure and a method of manufacturing the same.

According to an embodiment of the present invention, the method of manufacturing a zirconia contained nickel-based superalloy directed energy deposition structure may include: providing a nickel-based superalloy powder having a first average particle size; providing a zirconia powder having a second average particle size smaller than the first average particle size; forming a mixed powder by mixing the nickel-based superalloy powder and the zirconia powder; and forming nickel-based superalloy directed energy deposition structure by performing directed energy deposition with the mixed powder using a laser.

According to an embodiment of the present invention, the zirconia contained nickel-based superalloy directed energy deposition structure is a zirconia contained nickel-based superalloy directed energy deposition structure manufactured using the method for manufacturing the nickel-based superalloy directed energy deposition structure, and may include a nickel-based superalloy in the range of 98 wt % to 99 wt %; and a zirconia in the range of 1 wt % to 2 wt %.

BRIEF DESCRIPTION OF THE DRAWINGS

The above and other features and advantages of the present invention will become more apparent by describing in detail embodiments thereof with reference to the attached drawings in which:

FIGS. 5 to 10 show photographs of surfaces of zirconia contained nickel-based superalloy directed energy deposition structures, according to an embodiment of the present invention.

DETAILED DESCRIPTION OF THE INVENTION

Figure 1:
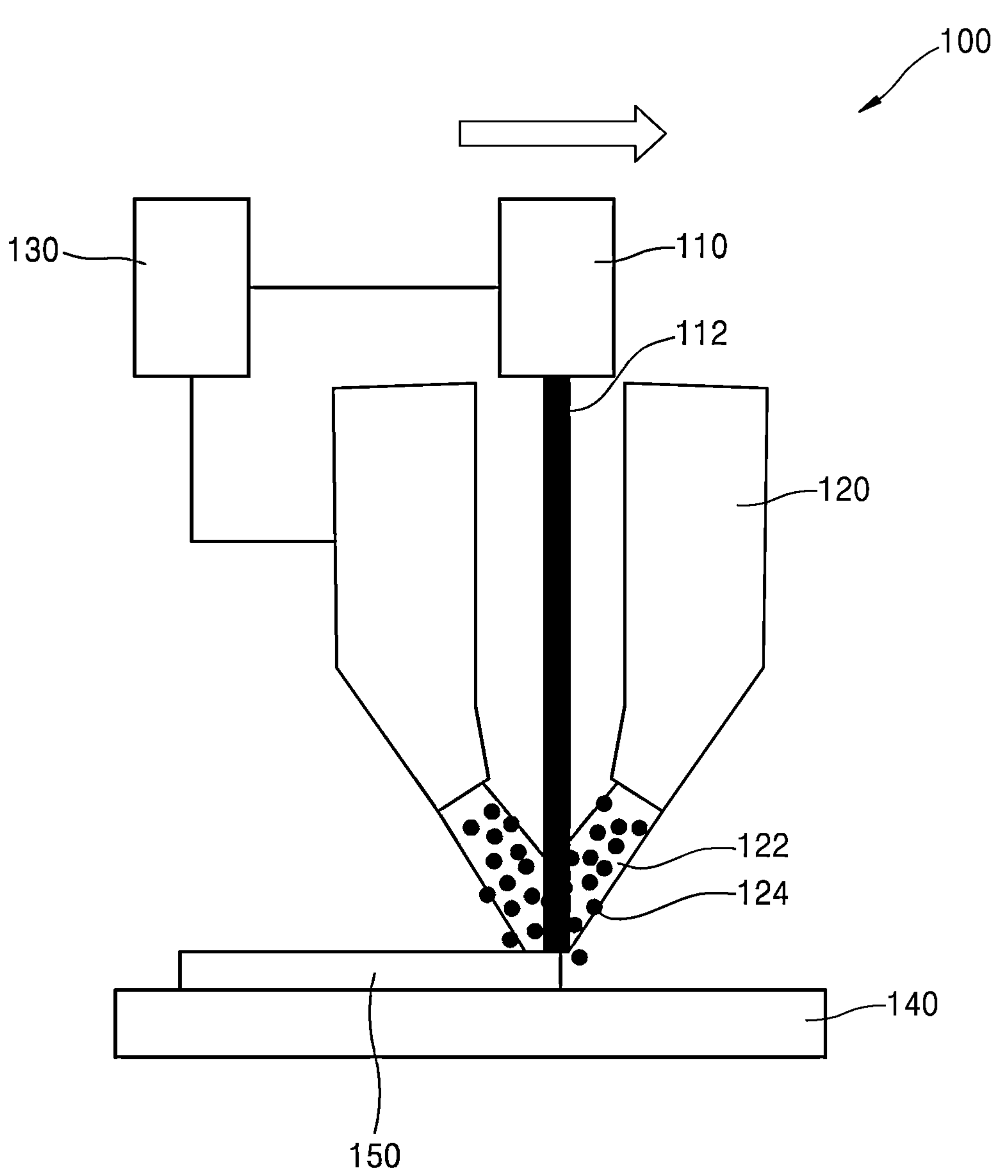
FIG. 1 is a schematic diagram showing a directed energy deposition apparatus for manufacturing a zirconia contained nickel-based superalloy directed energy deposition structure, according to an embodiment of the present invention.

Hereinafter, the present invention will be described in detail by explaining embodiments of the invention with reference to the attached drawings. The invention may, however, be embodied in many different forms and should not be construed as being limited to the embodiments set forth herein, rather, these embodiments are provided so that this disclosure will be thorough and complete, and will fully convey the concept of the invention to one of ordinary skill in the art. Like reference numerals refer to like elements throughout. Further, various elements and regions in the drawings are schematically illustrated. Therefore, the scope of the present invention is not limited by the relative sizes or distances shown in the attached drawings.

The grain refinement mechanism for solving the problem of grain coarsening of the deposition structure during the directed energy deposition process is as follows. First, by utilizing nucleation by an additive, the grain refinement of the deposition structure during solidification is realized by adding nanopowder as an additive to provide a nucleation site. Here, grain refinement may be realized due to nucleation by narrowing the spacing between the primary branches or the secondary branches of the dendrite. Second, by utilizing grain boundary pinning effects, the grain refinement of the deposition structure after solidification may be realized as additives or precipitates is fixed to the grain boundary to interfere grain growth.

In the case of nickel-based superalloys, the effects of adding TiC, WC, $Y_2O_3$, CNT, etc. have been studied. There has been little research of $ZrO_2$ addition to nickel-based superalloys. Since zirconia ($ZrO_2$) causes grain refinement effects in aluminum-based alloys, it is expected to provide grain refinement effects in nickel-based superalloys as well. $ZrO_2$ has advantages over $Y_2O_3$, which is composed of rare earth elements, in terms of material supply and cost. Therefore, when zirconia is mixed into nickel-based superalloys for the directed energy deposition process, grain refinement and prevention of texture anisotropy may be achieved. To this end, it is necessary to examine the effects of the size and addition amount of zirconia and the process variables for deposition on grain refinement and its mechanism.

FIG. 1 is a schematic diagram showing a directed energy deposition apparatus for manufacturing a zirconia contained nickel-based superalloy directed energy deposition structure, according to an embodiment of the present invention.

Referring to FIG. 1, the directed energy deposition apparatus 100 includes a laser unit 110, a mixed powder providing unit 120, and a control unit 130.

The laser unit 110 may provide a laser to a mixed powder.

The mixed powder providing unit 120 may provide mixed powder.

The control unit 130 may control operations of the laser unit 110 and the mixed powder providing unit 120. The control unit 130 may control a laser power, a laser scan speed, and a laser energy density, etc. of the laser unit 110. In addition, the control unit 130 may control an amount, a fraction, and a supply speed, etc. of the mixed powder of the mixed powder providing unit 120.

A mixed powder 124 is provided from the mixed powder providing unit 120 by a carrier gas 122, and at the same time, a laser 112 is provided by the laser unit 110, and then the mixed powder 124 is melted by the laser 112, thereby forming a deposition structure 150 on a base material 140. The laser unit 110 may move in the direction of an arrow, and accordingly, the deposition structure 150 may be formed at a location where the laser unit 110 has passed.

Figure 2:
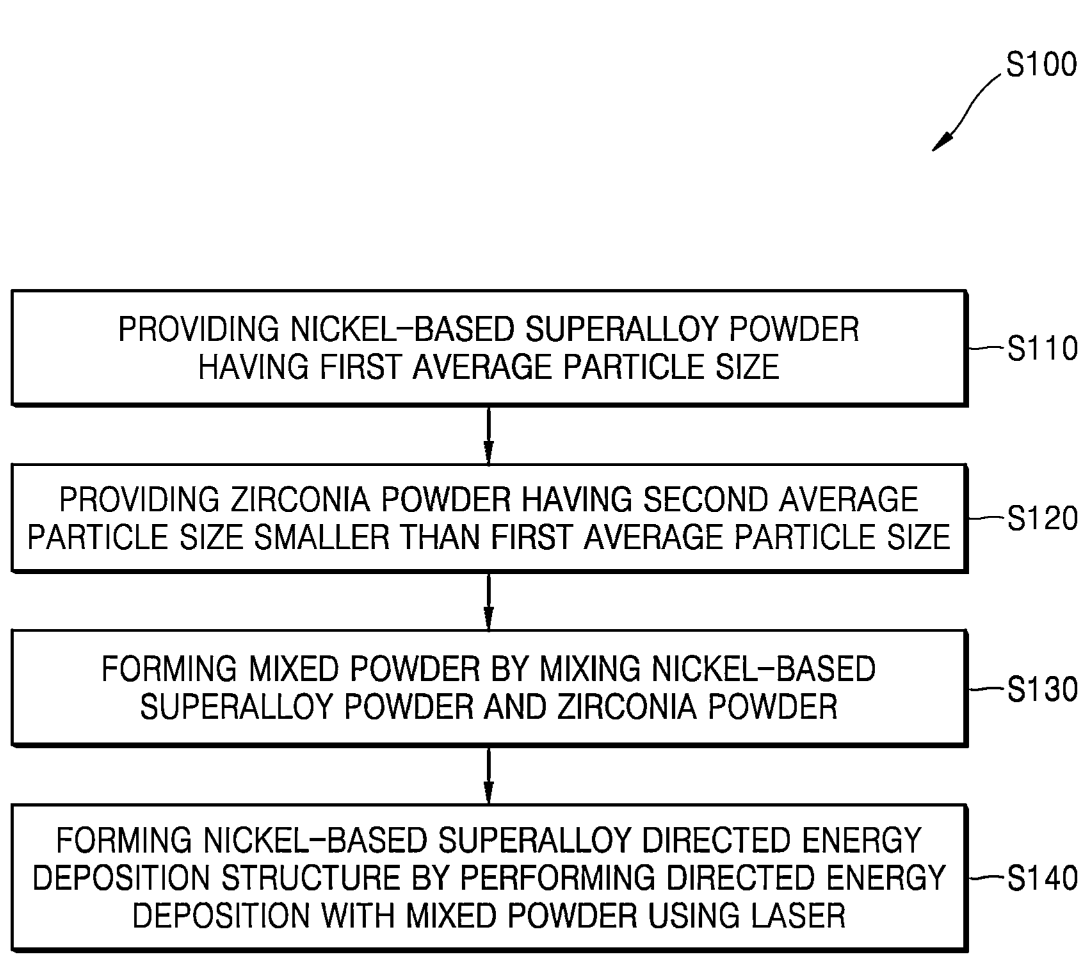
FIG. 2 is a flow chart showing a method of manufacturing a zirconia contained nickel-based superalloy directed energy deposition structure, according to an embodiment of the present invention.

FIG. 2 is a flow chart showing a method of manufacturing a zirconia contained nickel-based superalloy directed energy deposition structure, according to an embodiment of the present invention.

Referring to FIG. 2, a method of manufacturing a zirconia contained nickel-based superalloy directed energy deposition structure S100 may include providing a nickel-based superalloy powder having a first average particle size S110; providing a zirconia powder having a second average particle size smaller than the first average particle size S120; forming a mixed powder by mixing the nickel-based superalloy powder and the zirconia powder S130; and forming nickel-based superalloy directed energy deposition structure by performing directed energy deposition with the mixed powder using a laser S140.

The mixed powder may include the nickel-based superalloy powder in the range of 98 wt % to 99 wt % and the zirconia powder in the range of 1 wt % to 2 wt %. In the present specification, the mixed powder refers to a nickel-based superalloy mixed powder.

The nickel-based superalloy powder may have the first average particle size. The first average particle size may be in the range of 45 μm to 150 μm.

The zirconia powder may have the second average particle size smaller than the first average particle size. The second average particle size may be in the range of 20 nm to 200 nm.

The nickel-based superalloy powder may include Inconel 718 powder.

The nickel-based superalloy powder may include, based on the total weight of the nickel-based superalloy powder, 50 wt % to 55 wt % of nickel (Ni), 17 wt % to 21 wt % of chromium (Cr), 4.75 wt % to 5.50 wt % of niobium (Nb), 2.8 wt % to 3.30 wt % of molybdenum (Mo), 0.65 wt % to 1.15 wt % of titanium (Ti), 0.20 wt % to 0.80 wt % of aluminum (Al), 0.1 wt % to 1 wt % of cobalt (Co), and a remainder including iron and inevitable impurities.

In addition, the nickel-based superalloy powder may further include, based on the total weight of the nickel-based superalloy powder, at least one of equal to or less than 0.8 wt % of carbon (C), equal to or less than 0.35 wt % of manganese (Mn), equal to or less than 0.35 wt % of silicon (Si), equal to or less than 0.3 wt % copper (Cu), equal to or less than 0.015 wt % of phosphorus (P), and equal to or less than 0.015 wt % of sulfur (S).

In addition, the nickel-based superalloy powder may further include, based on the total weight of the nickel-based superalloy powder, at least one of more than 0 wt % to equal to or less than 0.8 wt % of carbon (C), more than 0 wt % to equal to or less than 0.35 wt % of manganese (Mn), more than 0 wt % to equal to or less than 0.35 wt % of silicon (Si), more than 0 wt % to equal to or less than 0.3 wt % copper (Cu), more than 0 wt % to equal to or less than 0.015 wt % of phosphorus (P), and more than 0 wt % to equal to or less than 0.015 wt % of sulfur(S).

The inevitable impurities cannot be excluded because unintended impurities may inevitably be mixed in from raw materials or the surrounding environment during a conventional manufacturing process. Since these impurities may be known to anyone skilled in the art of conventional manufacturing processes, not all the contents are specifically mentioned in this specification.

The mixed powder may be formed by mixing the nickel-based superalloy powder and the zirconia powder at a mixing speed, for example, in the range of 600 RPM (round per minute) to 800 RPM, for example, for 1 to 10 minutes.

The mixed powder may be formed by mixing with a mechanical mixing apparatus, and may be formed by stirring using, for example, a swing planetary mixer.

The forming the nickel-based superalloy directed energy deposition structure S140 may be performed using a laser power in the range of 200 W to 350 W.

The forming the nickel-based superalloy directed energy deposition structure S140 may be performed with a laser scan speed in the range of 600 mm/min to 1000 mm/min.

The forming the nickel-based superalloy directed energy deposition structure S140 may be performed with a laser energy density in the range of 179 J/mm to 417 J/mm.

In a preferred embodiment, the zirconia powder has an average particle size of 200 nm, the zirconia powder content is 2 wt %, and in the forming the nickel-based superalloy directed energy deposition structure S140, the laser power of the laser may be 250 W, and the laser scan speed of the laser may be 1000 mm/min.

According to an embodiment of the present invention, a zirconia contained nickel-based superalloy directed energy deposition structure is provided, manufactured using the method of manufacturing the zirconia contained nickel-based superalloy directed energy deposition structure.

The zirconia contained nickel-based superalloy directed energy deposition structure according to an embodiment of the present invention may include a nickel-based superalloy in the range of 98 wt % to 99 wt %; and zirconia in the range of 1 wt % to 2 wt %.

The directed energy deposition structure may have a porosity, for example, in the range of more than 0 vol % to equal to or less than 1.0 vol %. The directed energy deposition structure may have a porosity, for example, in the range of more than 0 vol % to equal to or less than 0.6 vol %.

The directed energy deposition structure may have a Vickers hardness, for example, in the range of 220 Hv to 300 Hv. The directed energy deposition structure may have a Vickers hardness, for example, in the range of 270 Hv to 300 Hv.

The directed energy deposition structure may include equiaxed grains having an average particle size, for example, in the range of 10 μm to 100 μm.

The directed energy deposition structure may include $Al_3Zr$ intermetallic compounds.

EXPERIMENTAL EXAMPLES

The following experimental examples are described to help understand the present invention. The following experimental examples are presented to help understand the invention, and the present invention is not limited to the following experimental examples.

Experimental Method

Raw materials for mixed powder according to an embodiment of the present invention were prepared. The nickel-based superalloy powder was Inconel 718 with a particle size in the range of 45 μm to 150 μm. The zirconia powder was prepared in two types: zirconia powder with an average particle size (or particle diameter) of 200 nm and zirconia powder with an average particle size of 20 nm.

In the mixed powder formed by mixing the nickel-based superalloy powder and the zirconia powder, the addition amount of the zirconia powder was 1 wt % (weight %) and 2 wt % based on the total weight of the mixed powder, and the remainder was the nickel-based superalloy powder.

In order to examine property changes due to mixing methods for the mixed powder, the nickel-based superalloy powder and the zirconia powder were mixed in two ways.

For comparative examples, the nickel-based superalloy powder and the zirconia powder were mixed by a ball milling method using zirconia balls, and the mixing speed was 140 RPM and the mixing time was 3 hours. After mixing, the zirconia balls were removed.

For embodiments of the present invention, the nickel-based superalloy powder and the zirconia powder were mixed using a swing planetary mixer, and the mixing speed was 700 RPM and the mixing time was 5 minutes. For the embodiments, only the nickel-based superalloy powder and the zirconia powder were mixed without using the zirconia balls and without including any other auxiliary materials.

Next, the mixed powder was used to form a deposition structure on a base material made of Inconel 718 using a directed energy deposition apparatus.

While the directed energy deposition apparatus irradiated a laser beam on the base material, the mixed powder was simultaneously sprayed onto the area where the laser beam was irradiated. The mixed powder was melted on the base material and then solidified again to form a single layer of deposition. By repeating this process to form multiple layers, a nickel-based superalloy directed energy deposition structure was formed on the base material as a result. The deposition consisted of five layers.

Table 1 shows common process conditions and common process variables for forming a nickel-based superalloy directed energy deposition structure with the mixed powder using the directed energy deposition apparatus, according to an embodiment of the present invention.

TABLE 1

| Process conditions | Process variables |
|---|---|
| Powder feed rate | 1.6 g/min |
| Powder value | 9.28 |
| Scan strategy | 90° rotating |
| Laser spot diameter | 400 μm |
| Thickness of one layer of deposition structure | 0.15 mm |
| Hatch spacing | 300 μm |
| Number of layers | 5 |
| Distance between deposition structures | 3 mm |

In Table 1, the powder value is a numerical value indicating motor rotation speed for supplying the mixed powder. For example, when the powder value is 100, it means the maximum speed of the motor. The amount of mixed powder discharged changes depending on the motor speed, and when the motor rotation speed is fast, discharged amount of powder increases. The powder feed rate is the amount of powder used per minute. Calibration is performed to convert the powder value into the powder feed rate as a pre-printing setting task. Based on this calibration data, the powder feed rate is approximated and matched. The thickness of one layer of the deposition structure means the thickness of the first layer on the G-co de, which is the setting value of the apparatus.

Analysis of the Surface Morphology of a Nickel-Based Superalloy Directed Energy Deposition Structure Hereinafter, the control of the surface morphology according to the process conditions of a nickel-based superalloy directed energy deposition structure will be described in detail.

Table 2 shows process variables for embodiments and comparative examples when a nickel-based superalloy directed energy deposition structure is formed using a directed energy deposition apparatus using a mixed powder according to an embodiment of the present invention. In Table 2, "B" refers ball milling mixing, and "S" refers swing planetary mixing.

TABLE 2

| Classification | Mixing method | Zirconia powder average particle size (nm) | Zirconia powder content (w %) | Laser scan speed (mm/min) | Laser power (W) | Laser energy density (J/mm) |
|---|---|---|---|---|---|---|
| Comparative example 1 | B | 200 | 1 | 600 | 150 | 250 |
| Comparative example 2 | B | 200 | 1 | 600 | 200 | 333 |
| Comparative example 3 | B | 200 | 1 | 600 | 250 | 417 |
| Comparative example 4 | B | 200 | 1 | 800 | 150 | 188 |
| Comparative example 5 | B | 200 | 1 | 800 | 200 | 250 |
| Comparative example 6 | B | 200 | 1 | 800 | 250 | 313 |
| Comparative example 7 | B | 200 | 1 | 1000 | 150 | 150 |
| Comparative example 8 | B | 200 | 1 | 1000 | 200 | 200 |
| Comparative example 9 | B | 200 | 1 | 1000 | 250 | 250 |
| Comparative example 10 | B | 200 | 2 | 600 | 150 | 250 |
| Comparative example 11 | B | 200 | 2 | 600 | 200 | 333 |
| Comparative example 12 | B | 200 | 2 | 600 | 250 | 417 |
| Comparative example 13 | B | 200 | 2 | 800 | 150 | 188 |
| Comparative example 14 | B | 200 | 2 | 800 | 200 | 250 |
| Comparative example 15 | B | 200 | 2 | 800 | 250 | 313 |
| Comparative example 16 | B | 200 | 2 | 1000 | 150 | 150 |
| Comparative example 17 | B | 200 | 2 | 1000 | 200 | 200 |
| Comparative example 18 | B | 200 | 2 | 1000 | 250 | 250 |
| Embodiment 1 | S | 200 | 1 | 600 | 150 | 250 |
| Embodiment 2 | S | 200 | 1 | 600 | 200 | 333 |
| Embodiment 3 | S | 200 | 1 | 600 | 250 | 417 |
| Embodiment 4 | S | 200 | 1 | 800 | 150 | 188 |
| Embodiment 5 | S | 200 | 1 | 800 | 200 | 250 |
| Embodiment 6 | S | 200 | 1 | 800 | 250 | 313 |

TABLE 2-continued

| Classification | Mixing method | Zirconia powder average particle size (nm) | Zirconia powder content (w %) | Laser scan speed (mm/min) | Laser power (W) | Laser energy density (J/mm) |
|---|---|---|---|---|---|---|
| Embodiment 7 | S | 200 | 1 | 1000 | 150 | 150 |
| Embodiment 8 | S | 200 | 1 | 1000 | 200 | 200 |
| Embodiment 9 | S | 200 | 1 | 1000 | 250 | 250 |
| Embodiment 10 | S | 200 | 2 | 600 | 150 | 250 |
| Embodiment 11 | S | 200 | 2 | 600 | 200 | 333 |
| Embodiment 12 | S | 200 | 2 | 600 | 250 | 417 |
| Embodiment 13 | S | 200 | 2 | 800 | 150 | 188 |
| Embodiment 14 | S | 200 | 2 | 800 | 200 | 250 |
| Embodiment 15 | S | 200 | 2 | 800 | 250 | 313 |
| Embodiment 16 | S | 200 | 2 | 1000 | 150 | 150 |
| Embodiment 17 | S | 200 | 2 | 1000 | 200 | 200 |
| Embodiment 18 | S | 200 | 2 | 1000 | 250 | 250 |
| Embodiment 19 | S | 20 | 1 | 600 | 150 | 250 |
| Embodiment 20 | S | 20 | 1 | 600 | 200 | 333 |
| Embodiment 21 | S | 20 | 1 | 600 | 250 | 417 |
| Embodiment 22 | S | 20 | 1 | 800 | 150 | 188 |
| Embodiment 23 | S | 20 | 1 | 800 | 200 | 250 |
| Embodiment 24 | S | 20 | 1 | 800 | 250 | 313 |
| Embodiment 25 | S | 20 | 1 | 1000 | 150 | 150 |
| Embodiment 26 | S | 20 | 1 | 1000 | 200 | 200 |
| Embodiment 27 | S | 20 | 1 | 1000 | 250 | 250 |
| Embodiment 28 | S | 20 | 2 | 600 | 150 | 250 |
| Embodiment 29 | S | 20 | 2 | 600 | 200 | 333 |
| Embodiment 30 | S | 20 | 2 | 600 | 250 | 417 |
| Embodiment 31 | S | 20 | 2 | 800 | 150 | 188 |
| Embodiment 32 | S | 20 | 2 | 800 | 200 | 250 |
| Embodiment 33 | S | 20 | 2 | 800 | 250 | 313 |
| Embodiment 34 | S | 20 | 2 | 1000 | 150 | 150 |
| Embodiment 35 | S | 20 | 2 | 1000 | 200 | 200 |
| Embodiment 36 | S | 20 | 2 | 1000 | 250 | 250 |

Referring to Table 2, the zirconia powder content was 1 wt % and 2 wt %, the laser scan speed was 600 mm/min, 800 mm/min, and 1000 mm/min, and the laser power was 150 W, 200 W, and 250 W.

Figure 3:
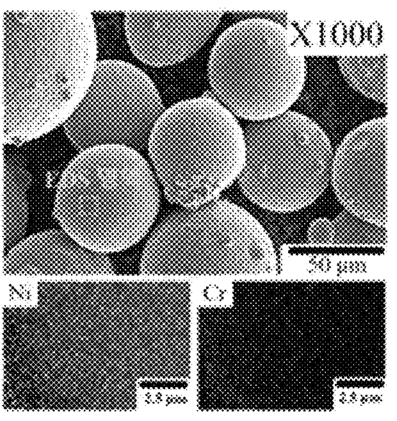
FIG. 3 shows photographs of raw materials and mixed powders for forming a zirconia contained nickel-based superalloy directed energy deposition structure, according to an embodiment of the present invention.
Figure 3:
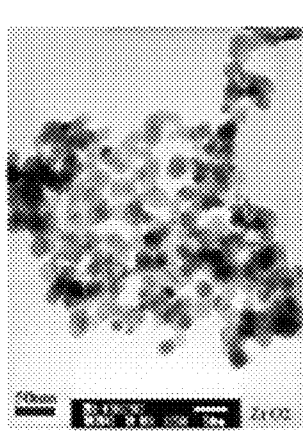
Figure 3:
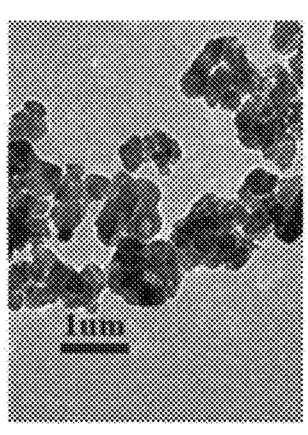
Figure 3:
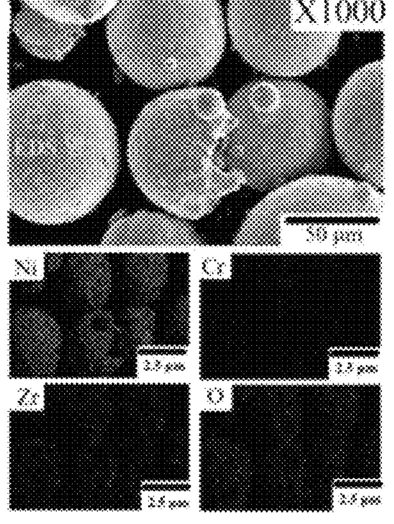
Figure 3:
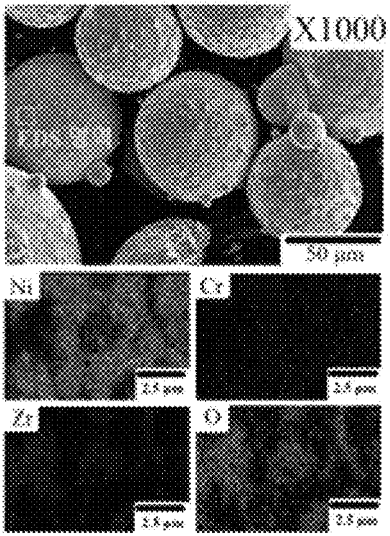

FIG. 3 shows photographs of raw materials and mixed powders for forming a zirconia contained nickel-based superalloy directed energy deposition structure, according to an embodiment of the present invention.

Referring to FIG. 3, as raw materials of the mixed powder, nickel-based superalloy powder of Inconel 718 having an average particle size in the range of 45 μm to 150 μm, zirconia powder having an average particle size of 20 nm, and zirconia powder having an average particle size of 200 nm are shown. In addition, ball milling mixed powder formed by ball milling as the comparative examples and swing planetary mixed powder formed by swing planetary mixing as the embodiments are shown.

Figure 4:
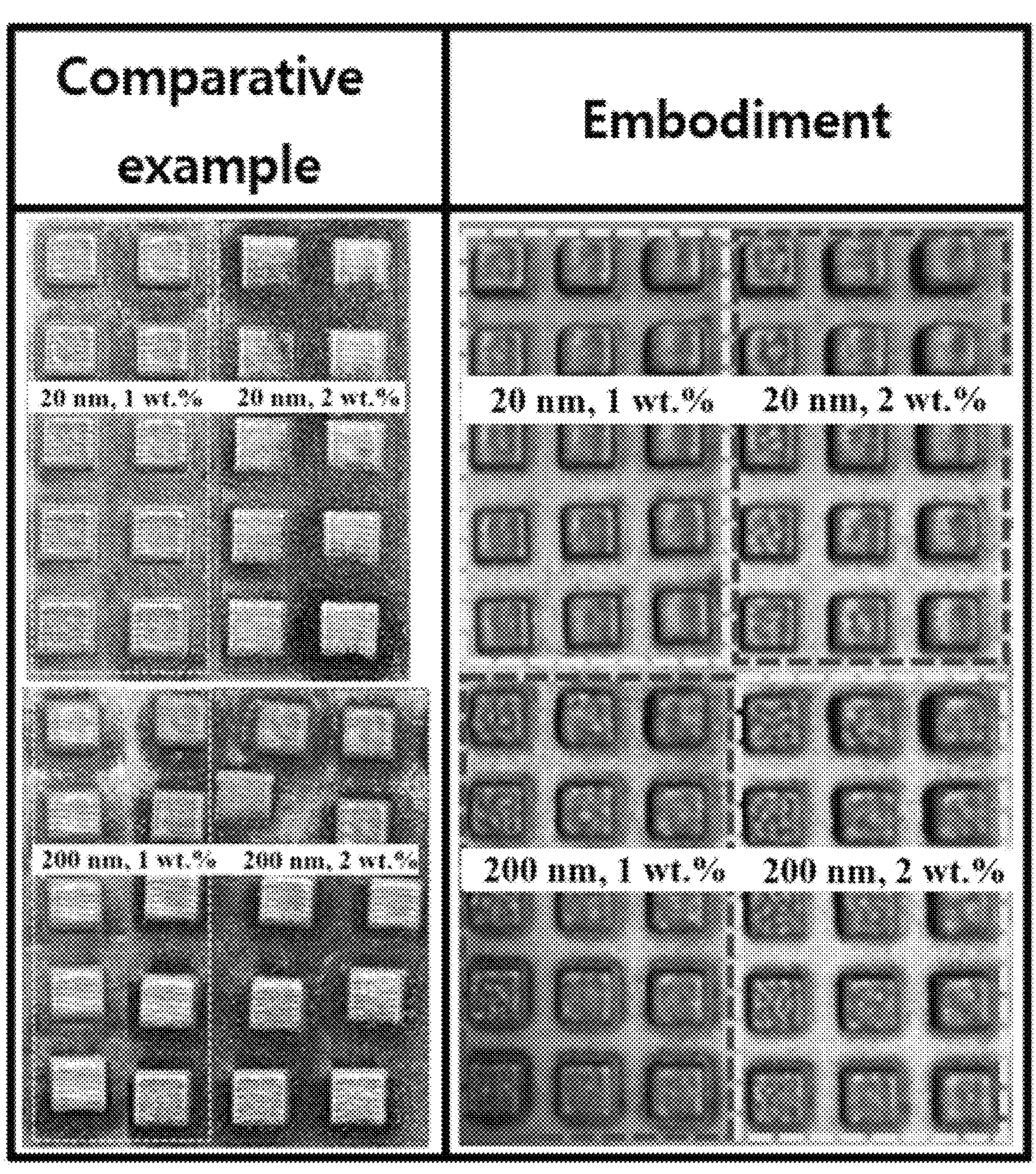
FIG. 4 shows photographs of appearances of zirconia contained nickel-based superalloy directed energy deposition structures, according to an embodiment of the present invention.

FIG. 4 shows photographs of appearances of zirconia contained nickel-based superalloy directed energy deposition structures, according to an embodiment of the present invention.

Referring to FIG. 4, in the case of the comparative examples mixed by ball milling, black soot generated around the deposition structure. It is analyzed that the soot was formed by carbon included in the nickel-based superalloy being forcibly separated from the nickel-based superalloy by ball milling, becoming individualized, and then being carbonized by the laser during the directed energy deposition process.

On the other hand, in all cases of the embodiments, that is, in the case of 20 nm or 200 nm of an average particle size of zirconia and 1 wt % or 2 wt % zirconia, the soot did not generate.

FIGS. 5 to 10 show photographs of surfaces of zirconia contained nickel-based superalloy directed energy deposition structures, according to an embodiment of the present invention.

FIG. 5 shows the cases where the average particle size of the zirconia powder is 200 nm, the zirconia powder content is 1 wt %, the laser scan speed is 600 mm/min, and the laser power is changed to 150 W, 200 W, and 250 W. FIG. 6 is the same as the conditions of FIG. 5 except that the laser scan speed is 800 mm/min. FIG. 7 is the same as the conditions of FIG. 5 except that the laser scan speed is 1000 mm/min. FIG. 8 is the same as the conditions of FIG. 5 except that the zirconia content is 2 wt %. FIG. 9 is the same as the conditions of FIG. 8 except that the laser scan speed is 800 mm/min. FIG. 10 is the same as the conditions of FIG. 8 except that the laser scan speed is 1000 mm/min.

The surface morphology of the deposition structures of FIGS. 5 to 10 were analyzed and are shown in Table 3 below.

Table 3 shows the results of analyzing the surface morphology of zirconia contained nickel-based superalloy directed energy deposition structures, according to an embodiment of the present invention.

TABLE 3

| Classification | Soot formation | Over-deposition | Humping | Evaluation |
|---|---|---|---|---|
| Comparative example 1 | ○ | ○ | ○ | 1 |
| Comparative example 2 | ○ | ○ | ○ | 1 |
| Comparative example 3 | ○ | ○ | ○ | 1 |

TABLE 3-continued

| Classification | Soot formation | Over-deposition | Humping | Evaluation |
|---|---|---|---|---|
| Comparative example 4 | ○ | ○ | ○ | 1 |
| Comparative example 5 | ○ | ○ | ○ | 1 |
| Comparative example 6 | ○ | ○ | ○ | 1 |
| Comparative example 7 | ○ | ○ | ○ | 1 |
| Comparative example 8 | ○ | ○ | ○ | 1 |
| Comparative example 9 | ○ | ○ | ○ | 1 |
| Comparative example 10 | ○ | ○ | ○ | 1 |
| Comparative example 11 | ○ | ○ | ○ | 1 |
| Comparative example 12 | ○ | ○ | ○ | 1 |
| Comparative example 13 | ○ | ○ | ○ | 1 |
| Comparative example 14 | ○ | ○ | ○ | 1 |
| Comparative example 15 | ○ | ○ | ○ | 1 |
| Comparative example 16 | ○ | ○ | ○ | 1 |
| Comparative example 17 | ○ | ○ | ○ | 1 |
| Comparative example 18 | ○ | ○ | ○ | 1 |
| Embodiment 1 | X | ○ | ○ | 2 |
| Embodiment 2 | X | ○ | Δ | 3 |
| Embodiment 3 | X | ○ | X | 4 |
| Embodiment 4 | X | ○ | ○ | 2 |
| Embodiment 5 | X | ○ | Δ | 3 |
| Embodiment 6 | X | ○ | X | 4 |
| Embodiment 7 | X | ○ | ○ | 2 |
| Embodiment 8 | X | ○ | Δ | 3 |
| Embodiment 9 | X | ○ | X | 4 |
| Embodiment 10 | X | ○ | ○ | 2 |
| Embodiment 11 | X | ○ | Δ | 3 |
| Embodiment 12 | X | ○ | X | 4 |
| Embodiment 13 | X | ○ | ○ | 2 |
| Embodiment 14 | X | ○ | Δ | 3 |
| Embodiment 15 | X | ○ | X | 4 |
| Embodiment 16 | X | ○ | ○ | 2 |
| Embodiment 17 | X | ○ | Δ | 3 |
| Embodiment 18 | X | X | X | 5 |

In Table 3, "O" means occurrence, "Δ" means slight occurrence, and "X" means no occurrence. In addition, in the evaluation of Table 3, "1" means poor, "2" means partially poor, "3" means average, "4" means good, and "5" means very good. Over-deposition is observed as being deposited higher than the expected height, and the surface of the deposition structure has a convex shape. Humping means a partially protruding area.

Referring to Table 3, in the case of the comparative examples, soot, over-deposition, and humping occurred in all cases, and were evaluated as poor.

In the case of the embodiments, soot did not occur in any cases. However, over-deposition occurred in all cases except for Embodiment 18.

In Embodiments 1, 4, 7, 10, 13, and 16 where the laser power was 150 W, humping significantly occurred.

In Embodiments 2, 5, 8, 11, 14, and 17 where the laser power was 200 W, humping occurred slightly.

In Embodiments 3, 6, 9, 12, 15, and 18 where the laser power was 250 W, humping hardly occurred.

Hereinafter, For the case of 200 nm of an average particle size and 2 wt % of zirconia powder, the results of forming a deposition structure by changing the laser power and the laser scan speed in various ranges will be examined. The laser power and the laser scan speed were changed to have five laser energy densities, such as 417 J/mm, 313 J/mm, 250 J/mm, 208 J/mm, and 179 J/mm.

Table 4 shows process variables for manufacturing a zirconia contained nickel-based superalloy directed energy deposition structures, according to an embodiment of the present invention.

TABLE 4

| Classification | Mixing method | Zirconia powder average particle size (nm) | Zirconia powder content (w %) | Laser scan speed (mm/min) | Laser power (W) | Laser energy density (J/mm) |
|---|---|---|---|---|---|---|
| Embodiment 37 | S | 200 | 2 | 360 | 150 | 417 |
| Embodiment 38 | S | 200 | 2 | 480 | 150 | 313 |
| Embodiment 39 | S | 200 | 2 | 600 | 150 | 250 |
| Embodiment 40 | S | 200 | 2 | 720 | 150 | 208 |
| Embodiment 41 | S | 200 | 2 | 840 | 150 | 179 |
| Embodiment 42 | S | 200 | 2 | 600 | 250 | 417 |
| Embodiment 43 | S | 200 | 2 | 800 | 250 | 313 |
| Embodiment 44 | S | 200 | 2 | 1000 | 250 | 250 |
| Embodiment 45 | S | 200 | 2 | 1200 | 250 | 208 |
| Embodiment 46 | S | 200 | 2 | 1400 | 250 | 179 |
| Embodiment 47 | S | 200 | 2 | 840 | 350 | 417 |
| Embodiment 48 | S | 200 | 2 | 1120 | 350 | 313 |
| Embodiment 49 | S | 200 | 2 | 1400 | 350 | 250 |
| Embodiment 50 | S | 200 | 2 | 1680 | 350 | 208 |
| Embodiment 51 | S | 200 | 2 | 1960 | 350 | 179 |

Figure 11:
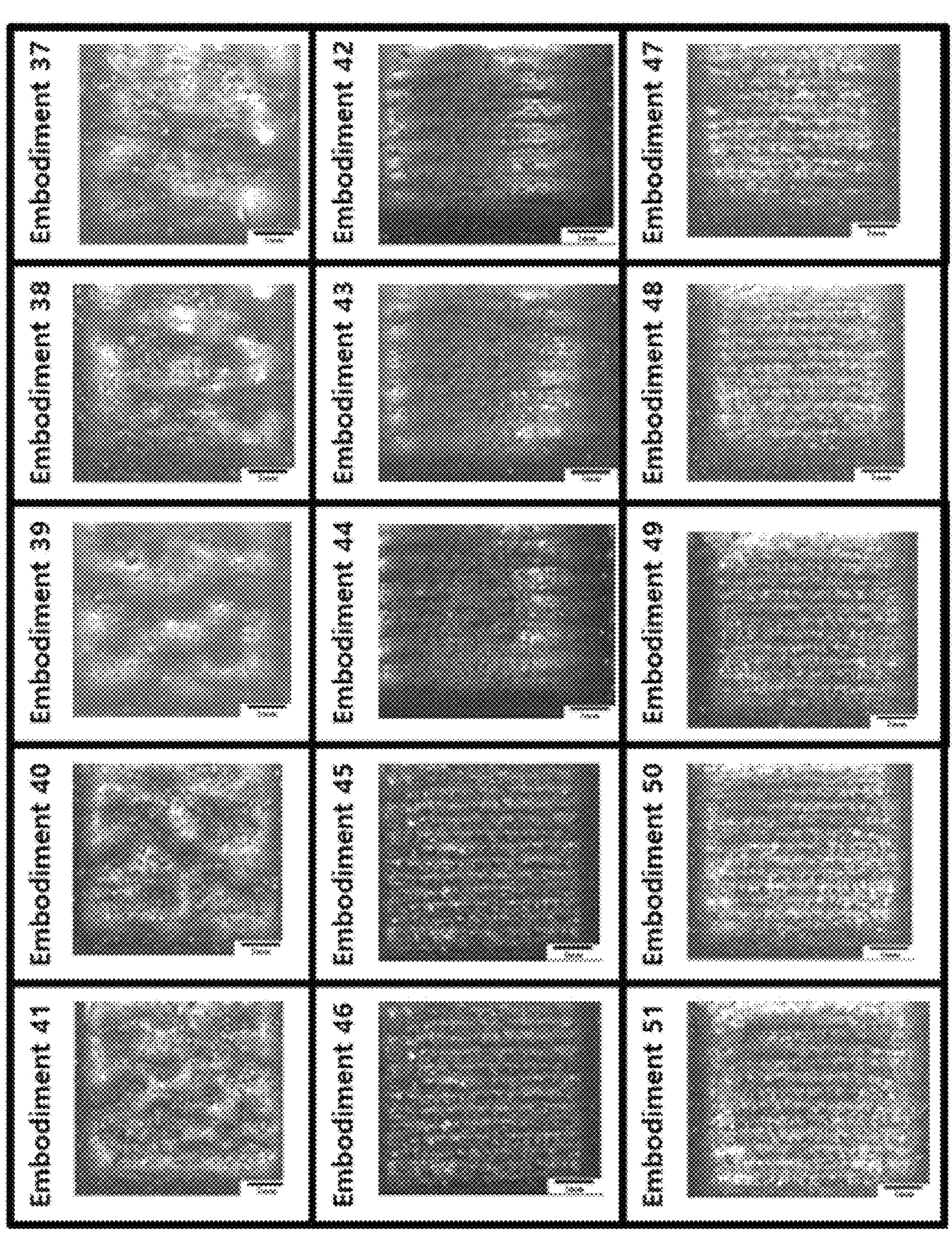
FIG. 11 shows photographs of surfaces of zirconia contained nickel-based superalloy directed energy deposition structures, according to an embodiment of the present invention.

FIG. 11 shows photographs of surfaces of zirconia contained nickel-based superalloy directed energy deposition structures, according to an embodiment of the present invention.

The surface morphology of the deposition structure of FIG. 11 was analyzed and shown in Table 5 below.

Table 5 shows the results of analyzing the surface morphology of deposition structures with a nickel-based superalloy mixed powder using a directed energy deposition apparatus, according to an embodiment of the present invention.

TABLE 5

| Classification | Soot formation | Over-deposition | Humping | Deposition structure Maximum height (mm) |
|---|---|---|---|---|
| Embodiment 37 | X | ○ | ○ | 3.75 |
| Embodiment 38 | X | ○ | ○ | 3.33 |
| Embodiment 39 | X | ○ | ○ | 2.74 |
| Embodiment 40 | X | ○ | ○ | 2.56 |
| Embodiment 41 | X | ○ | ○ | 2.25 |
| Embodiment 42 | X | ○ | X | 2.65 |
| Embodiment 43 | X | ○ | X | 1.90 |
| Embodiment 44 | X | X | X | 1.27 |
| Embodiment 45 | X | X | X | 0.75 |
| Embodiment 46 | X | X | X | 0.65 |
| Embodiment 47 | X | ○ | X | 2.45 |
| Embodiment 48 | X | ○ | X | 2.16 |
| Embodiment 49 | X | ○ | X | 1.99 |
| Embodiment 50 | X | X | X | 1.85 |
| Embodiment 51 | X | X | X | 1.54 |

Referring to Table 5, in all of Embodiments 37 to 51, soot was not generated. In addition, in all of Embodiments 37 to 51, a balling phenomenon in which the powder did not melt was observed.

In Embodiments 37 to 41, where the laser power was 150 W, humping occurred, and as the scan speed increased, the maximum height of the deposition structure decreased.

In Embodiments 42 to 46, where the laser power was 250 W, humping did not occur. As the laser scan speed increased, the surface morphology became smoother. Over-deposition occurred at laser scan speeds of 600 mm/min and 800 mm/min, but over-deposition hardly occurred at equal to or more than 1000 mm/min. When the laser scan speed was very fast at 1200 mm/min and 1400 mm/min, the surface was relatively uneven and had a bumpy shape. Compared to 150 W laser power, the laser power increased and the scan speed increased, so that the surface morphology of the deposition structure was controlled.

In Embodiments 47 to 51 where the laser power was 350 W, humping did not occur. Over-deposition occurred at laser scan speeds of 840 mm/min, 1120 mm/min, and 1400 mm/min, but over-deposition hardly occurred at 1680 mm/min and 1960 mm/min. At laser scan speeds of 1680 mm/min and 1960 mm/min, the surface was observed to be sunken, and the surface morphology was uneven.

The maximum height of the deposition structure is theoretically calculated as 0.75 mm because the height of each layer is 0.15 mm in the set value of G-code and there are 5 layers. However, it may be seen that the maximum height of the deposition structure changes depending on various external variables such as powder feed rate and process variables. For Embodiments 45 and 46, the heights are close to the theoretical value of 0.75 mm.

Analysis of Porosity of Nickel-Based Superalloy Directed Energy Deposition Structure Hereinafter, the surface morphology control according to the process conditions of the nickel-based superalloy directed energy deposition structure will be described in detail.

Figure 12:
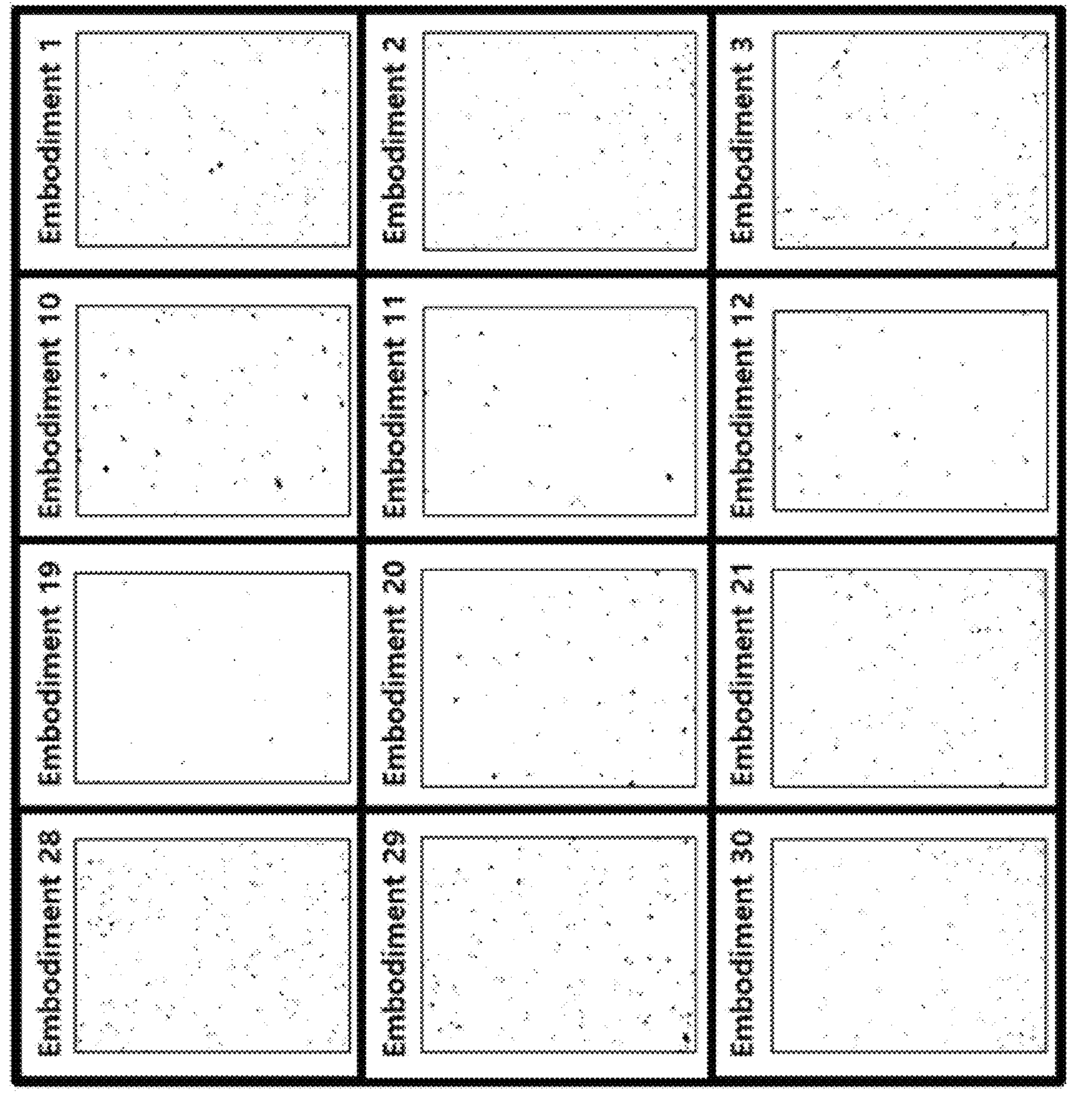
FIGS. 12 and 13 show photographs of porosity of zirconia contained nickel-based superalloy directed energy deposition structures, according to an embodiment of the present invention.
Figure 13:
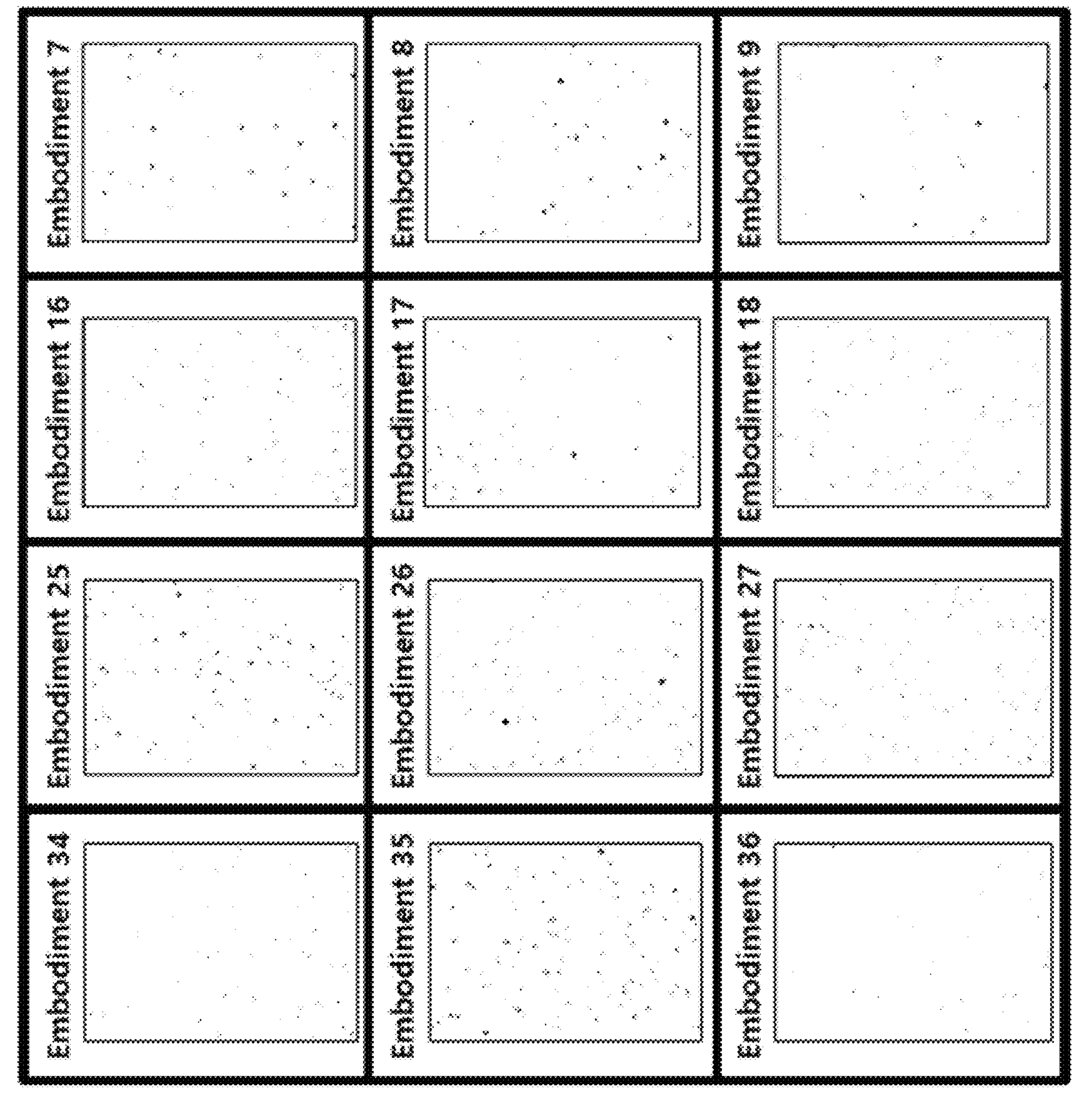

FIGS. 12 and 13 show photographs of porosity of zirconia contained nickel-based superalloy directed energy deposition structures, according to an embodiment of the present invention.

Referring to FIG. 12, porosity in the zirconia contained nickel-based superalloy directed energy deposition structures formed at a laser scan speed of 600 mm/min are shown.

Referring to FIG. 13, porosity in the zirconia contained nickel-based superalloy directed energy deposition structures formed at a laser scan speed of 1000 mm/min are shown.

Figure 14:
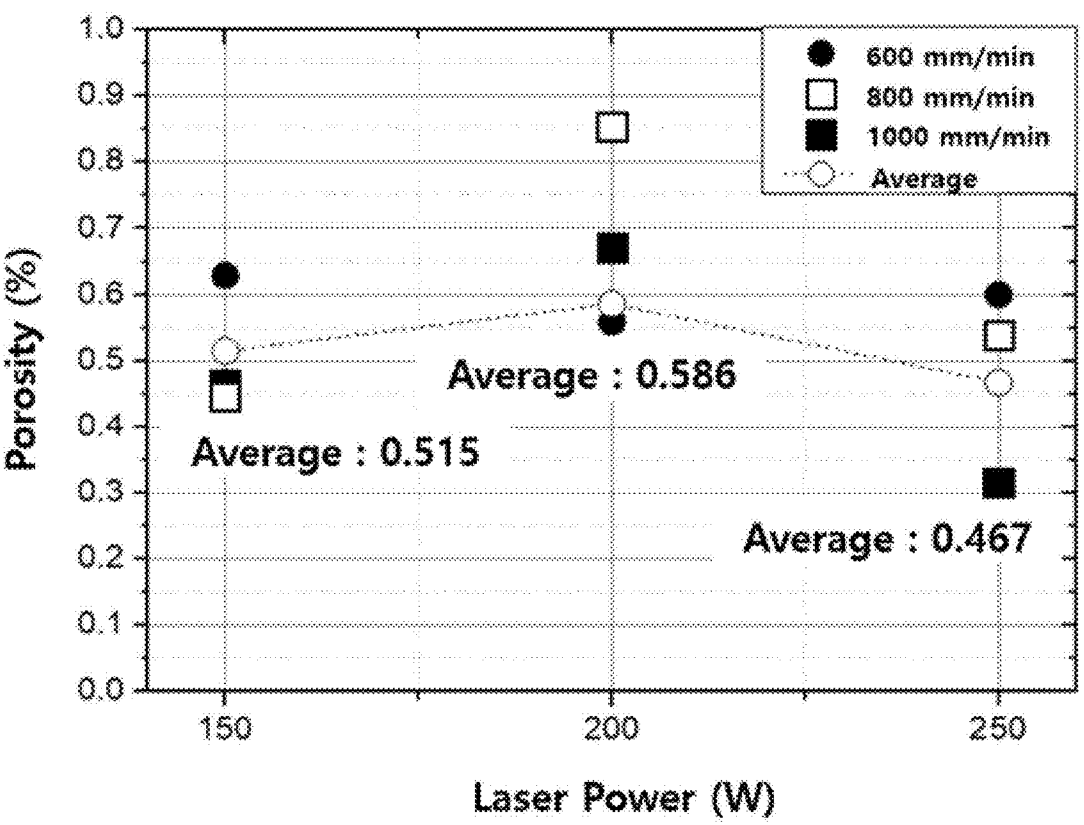
FIG. 14 to FIG. 16 show graphs of relationship between porosity and process conditions of zirconia contained nickel-based superalloy directed energy deposition structures, according to an embodiment of the present invention.
Figure 15:
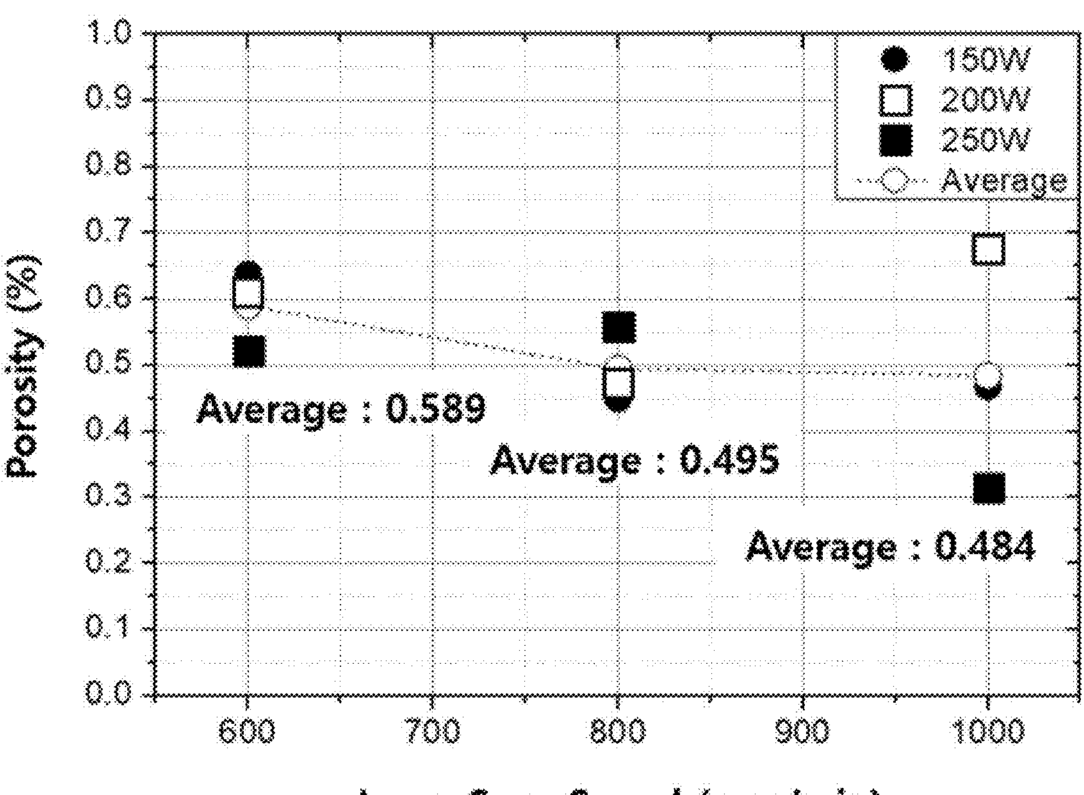
Figure 16:
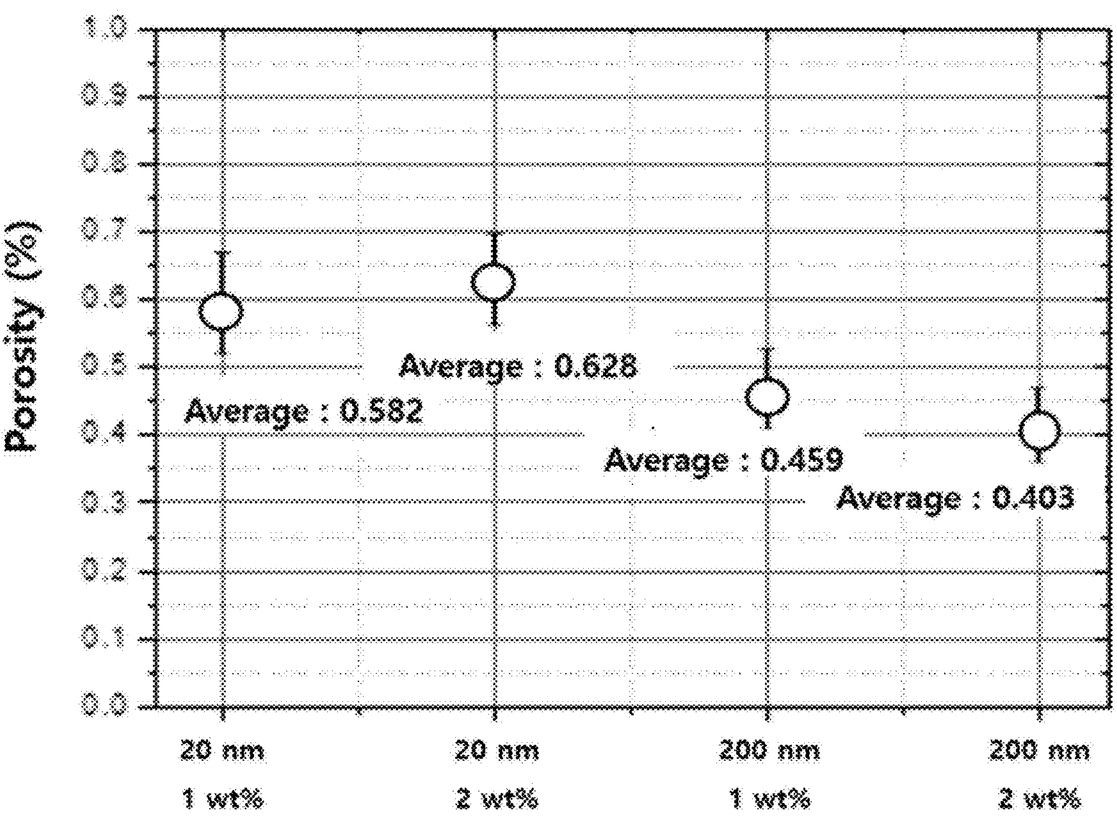

FIG. 14 to FIG. 16 show graphs of relationship between porosity and process conditions of zirconia contained nickel-based superalloy directed energy deposition structures, according to an embodiment of the present invention.

Referring to FIG. 14, the porosity of zirconia contained nickel-based superalloy directed energy deposition structures with respect to laser power is shown. The average particle size of the zirconia powder is 200 nm, and the content is 2 wt %. The average porosity is 0.515 volume % at 150 W of the laser power, 0.586 volume % at 200 W of the laser power, and 0.467 volume % at 250 W of the laser power. Therefore, the average porosity at 200 W of the laser power is the highest, and the average porosity at 250 W of the laser power is the lowest. In addition, at 250 W of the laser power, the porosity decreases as the laser scan speed increases, and the porosity at 1000 mm/min of the laser scan speed is the lowest.

Referring to FIG. 15, the porosity of the zirconia contained nickel-based superalloy directed energy deposition structure with respect to the laser scan speed is shown. The average particle size of the zirconia powder is 200 nm, and the content is 2 wt %. The average porosity is 0.589 vol % at 600 mm/min of the laser scan speed, 0.495 vol % at 800 mm/min of the laser scan speed, and 0.484 vol % at 1000 mm/min of the laser scan speed. Therefore, the average porosity at 600 mm/min of the laser scan speed is the highest the average porosity at 1000 mm/min of the laser scan speed is the lowest. In addition, at 1000 mm/min of the laser scan speed, the porosity is the lowest at 250 W of the laser power.

Referring to FIG. 16, the porosity of the zirconia contained nickel-based superalloy directed energy deposition structure with respect to the average particle size and zirconia powder content is shown. When the average particle size of the zirconia powder is 20 nm and the content is 1 wt %, the average porosity is 0.582 vol %. When the average particle size is 20 nm and the content is 2 wt %, the average porosity is 0.628 vol %. When the average particle size is 200 nm and the content is 1 wt %, the average porosity is 0.459 vol %. When the average particle size is 200 nm and the content is 2 wt %, the average porosity is 0.403 vol %. When the average particle size of the zirconia powder is 20 nm, the average porosity increases as the content increases. When the average particle size of the zirconia powder is 200 nm, the average porosity decreases as the content increases. When the average particle size of the zirconia powder is 200 nm and the content is 2 wt %, the average porosity is the lowest.

Hereinafter, when the zirconia average particle size is 200 nm and the content is 2 wt %, the results of forming a deposition structure by changing the laser power and laser scan speed in various ranges will be examined. The laser power and laser scan speed were changed to have five laser energy densities, such as 417 J/mm, 313 J/mm, 250 J/mm, 208 J/mm, and 179 J/mm. The process variables are as shown in Table 4.

Figure 17:
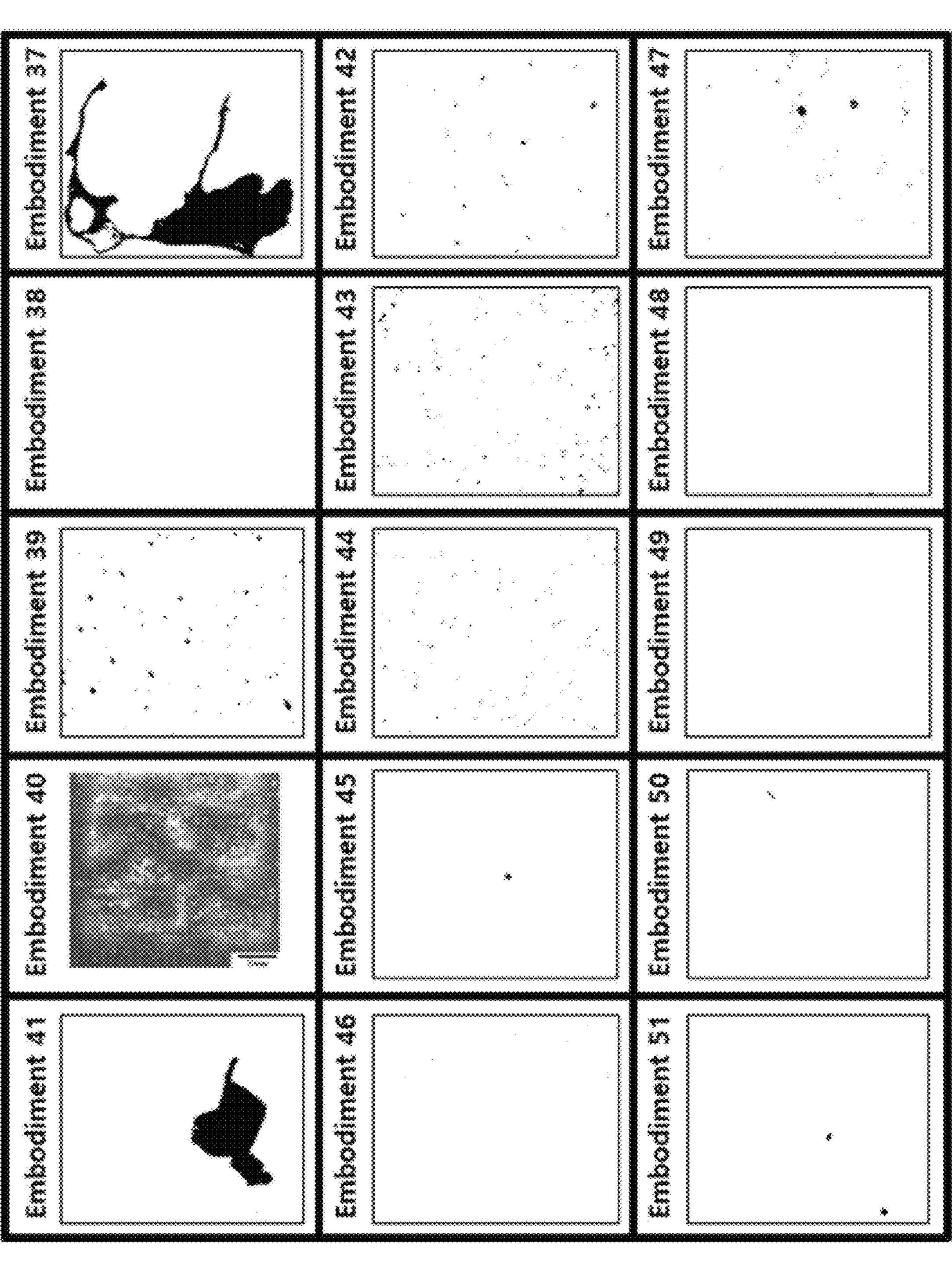
FIG. 17 shows photographs of porosity of zirconia contained nickel-based superalloy directed energy deposition structures, according to an embodiment of the present invention.

FIG. 17 shows photographs of porosity of zirconia contained nickel-based superalloy directed energy deposition structures, according to an embodiment of the present invention.

Referring to FIG. 17, at 150 W of the laser power, lack of fusion occurred as in Embodiments 37, 40, and 41. In the embodiments at 250 W and 350 W of the laser powers, lack of fusion did not occur.

Figure 18:
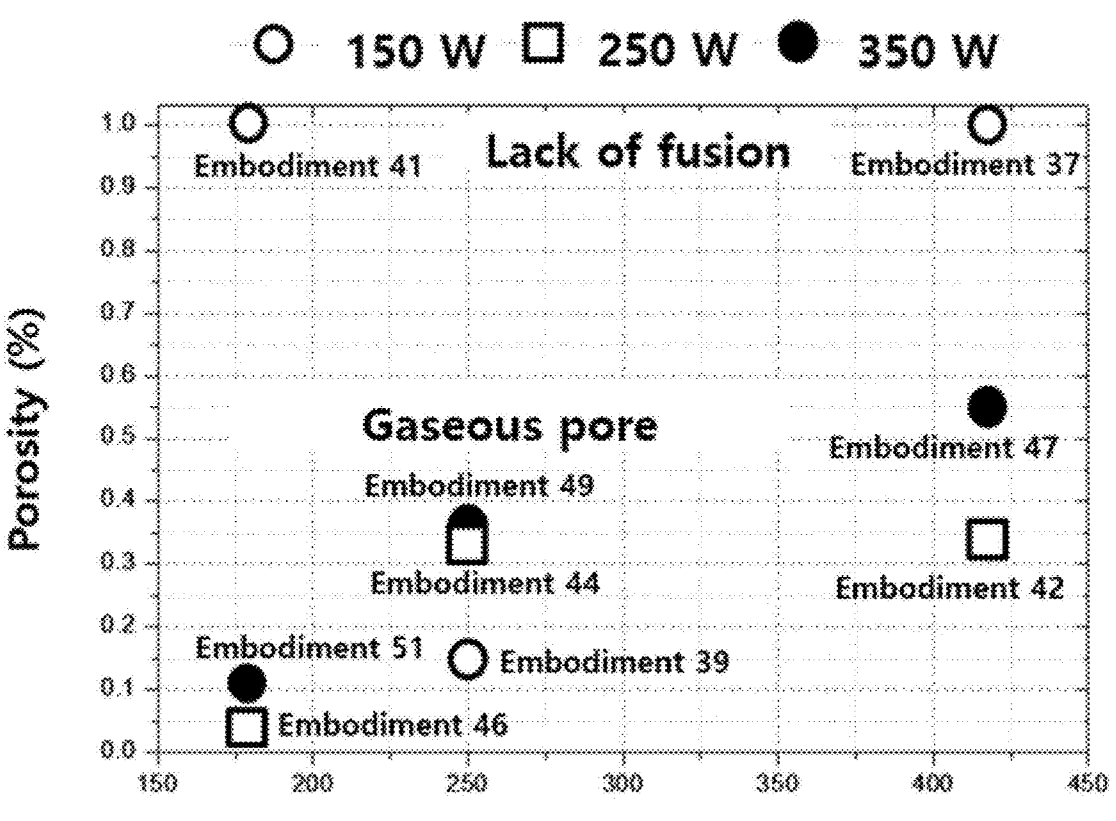
FIG. 18 shows graph of relationship between porosity and laser energy density of zirconia contained nickel-based superalloy directed energy deposition structures, according to an embodiment of the present invention.

FIG. 18 shows graph of relationship between porosity and laser energy density of zirconia contained nickel-based superalloy directed energy deposition structures, according to an embodiment of the present invention.

Referring to FIG. 18, at 150 W of the laser power, lack of fusion occurred at 417 J/mm of the laser energy density (Embodiment 37) and 179 J/mm of the laser energy density (Embodiment 41). Other embodiments show equal to or less than 1 vol % of a porosity, and further show equal to or less than 0.6 vol % of a porosity. The overall low porosity is shown at 250 W of the laser power. The porosity is the lowest at 250 W of the laser power and 179 J/mm of the laser energy density (Embodiment 46).

Hardness of the zirconia contained nickel-based superalloy directed energy deposition structure was measured using a Vickers hardness tester. The hardness was measured along the vertical depth from the surface of the deposition structure toward the interface with the parent material (IN718).

Figure 19:
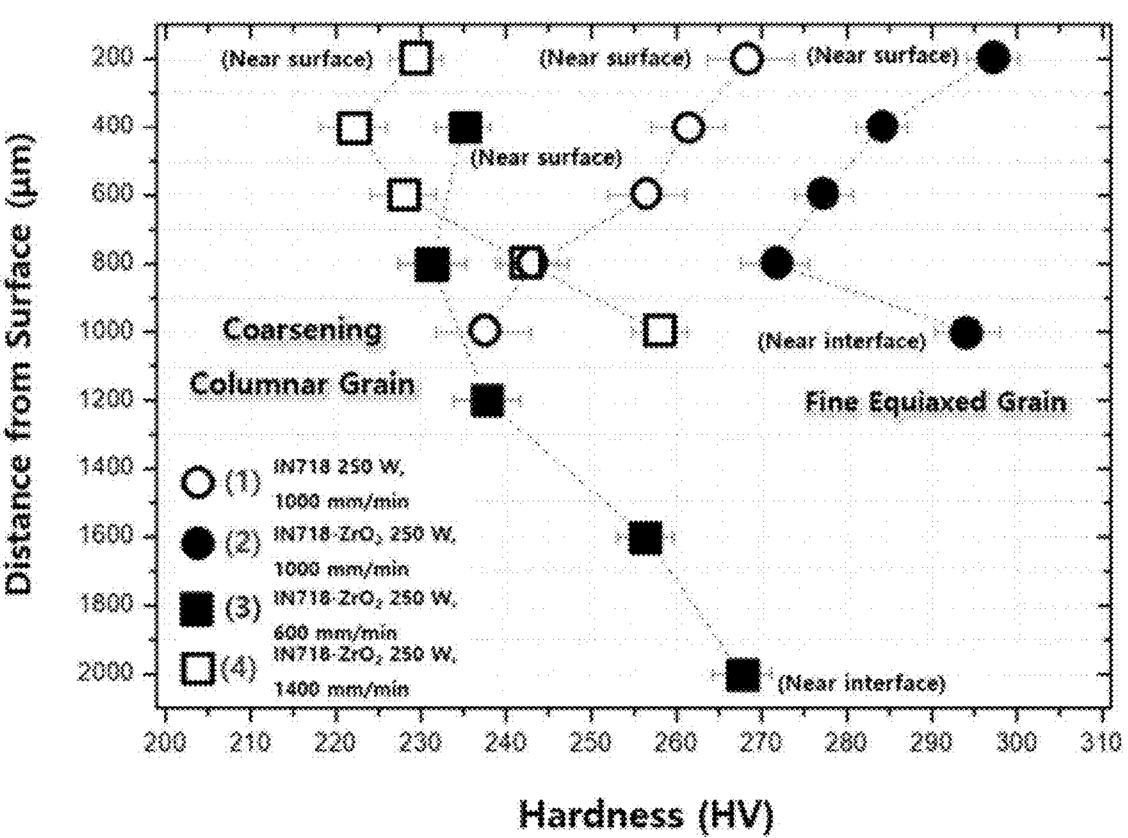
FIG. 19 shows a graph of hardness of zirconia contained nickel-based superalloy directed energy deposition structures, according to an embodiment of the present invention.

FIG. 19 shows a graph of hardness of zirconia contained nickel-based superalloy directed energy deposition structures, according to an embodiment of the present invention.

Referring to FIG. 19, deposition structure (1) formed using nickel-based superalloy powder (IN718), not including zirconia, at 250 W of the laser power and 1000 mm/min of the laser scan speed has Vickers hardness in the range of about 230 Hv to less than 270 Hv. On the other hand, deposition structure (2) formed using a mixed powder including zirconia at 250 W of the laser power and 1000 mm/min of the laser scan speed has Vickers hardness in the range of about 270 Hv to 300 Hv according to an embodiment of the present invention. Therefore, when the nickel-based superalloy powder is formed with zirconia, Vickers hardness increases, and this tendency of increasing Vickers hardness appears overall from the surface to the interface.

Deposition structure (3) and deposition structure (4) formed using mixed powder including zirconia at 250 W of the laser power and 600 mm/min of the laser scan speed have lower Vickers hardness than the deposition structure (2) according to an embodiment of the present invention.

The directed energy deposition structure according to an embodiment of the present invention has, for example, the range of 220 Hv to 300 Hv of Vickers hardness, and may have, for example, the range of 270 Hv to 300 Hv of Vickers hardness.

Figure 20:
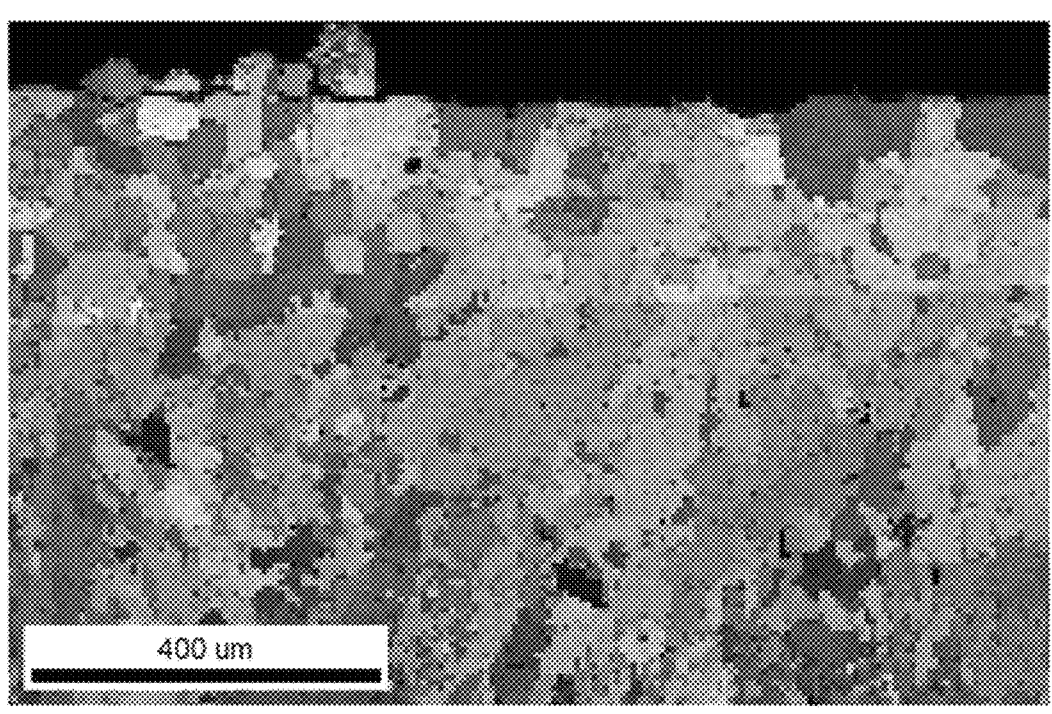
FIGS. 20 and 21 show photographs of microstructure of zirconia contained nickel-based superalloy directed energy deposition structure, according to an embodiment of the present invention.
Figure 21:
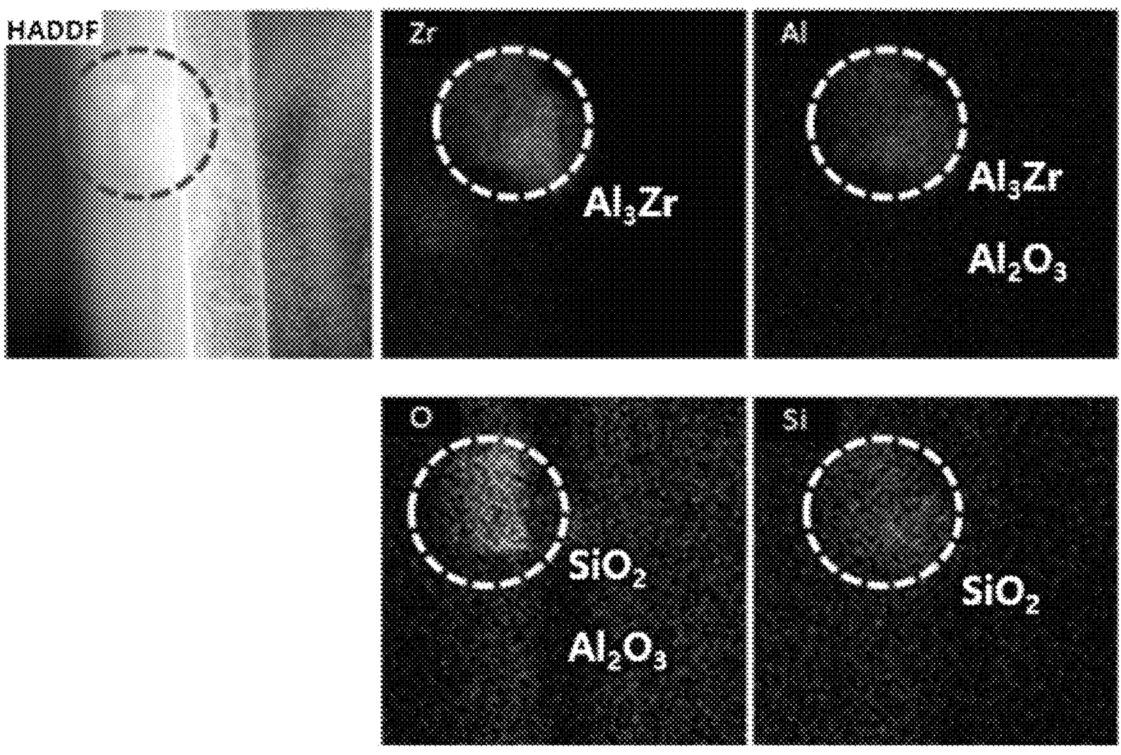

FIGS. 20 and 21 show photographs of microstructure of zirconia contained nickel-based superalloy directed energy deposition structure, according to an embodiment of the present invention.

Referring to FIG. 20, the microstructure of the directed energy deposition structure formed at 250 W of the laser power and 1000 mm/min of the laser scan speed with an average particle size of 200 nm and 2 wt % zirconia powder is shown. Since the zirconia powder is 2 wt %, it may be seen that many nucleation sites are provided to form fine equiaxed grains. In addition, the grain refinement effect occurred, and the microstructures of the surface and interior of the deposition structure were uniform. Since the zirconia powder content is relatively high, it is analyzed that grain growth is delayed, and heterogeneous nucleation sites are activated. The equiaxed grains had an average particle size in the range of about 10 μm to 100 μm.

Referring to FIG. 21, the TEM-EDS results of the directed energy deposition structure formed with the zirconia powder having an average particle size of 200 nm and 2 wt % at 250 W of the laser power and 1000 mm/min of the laser scan speed are shown. An $Al_3Zr$ intermetallic compounds were observed. The $Al_3Zr$ intermetallic compounds were crystallized or precipitated on oxides such as $SiO_2$ and $Al_2O_3$ regardless of locations in the deposition structure. The $Al_3Zr$ intermetallic compound may act as an inoculant, induce heterogeneous nucleation, or perform a grain boundary pinning role to implement grain refinement. The $Al_3Zr$ intermetallic compound is analyzed as a metastable $L1_2$ structure.

The present invention provides a nickel-based superalloy mixed powder having zirconia for directed energy deposition, a nickel-based superalloy directed energy deposition structure and a method of manufacturing the same.

The mixed powder was mixed by a swing planetary mixer, and when forming a deposition structure by directed energy deposition no soot was formed, unlike ball milling mixing in which soot is formed. Therefore, the mixed powder mixed by swing planetary mixing may excellently control the surface morphology of the deposition structure.

When a deposition structure is formed, humping is formed under low laser power conditions of 150 W and 200 W, regardless of the scan speed. However, no humping is formed under high laser power conditions of 250 W and 350 W. Therefore, the surface morphology of the deposition structure may be controlled under laser power equal to or more than 250 W.

When the zirconia powder had an average particle size of 200 nm, the zirconia powder content was 2 wt %, the laser power of the laser was 250 W, and the laser scan speed of the laser was 1000 mm/min, the nickel-based superalloy directed energy deposition structure had the highest hardness.

The nickel-based superalloy directed energy deposition structure has a porosity in the range of equal to or less than 1.0 vol %, and in particular, a porosity of equal to or less than 0.6 vol %. In addition, it has Vickers hardness in the range of 270 Hv to 300 Hv, which is higher than that in the case where zirconia is not included.

The directed energy deposition structure has equiaxed grains having an average particle size in the range of 10 μm to 100 μm and an $Al_3Zr$ intermetallic compound. Accordingly, a grain refinement effect occurs, and the microstructure of the surface and the inside of the deposition structure is uniform. The $Al_3Zr$ intermetallic compound may act as an inoculant, induce heterogeneous nucleation, or perform a grain boundary pinning to implement grain refinement.

The above-described effects of the present invention are merely examples, and the scope of the present invention is not limited thereto. While the present invention has been particularly shown and described with reference to embodiments thereof, it will be understood by one of ordinary skill in the art that various changes in form and details may be made therein without departing from the scope of the present invention as defined by the following claims.

What is claimed is:

1. A method of manufacturing a zirconia contained nickel-based superalloy directed energy deposition structure, comprising:

providing a nickel-based superalloy powder having a first average particle size;

providing a zirconia powder having a second average particle size smaller than the first average particle size;

forming a mixed powder by mixing the nickel-based superalloy powder and the zirconia powder; and forming a nickel-based superalloy directed energy deposition structure by performing directed energy deposition with the mixed powder using a laser, wherein the mixed powder is formed by mixing the nickel-based superalloy powder and the zirconia powder using a swing planetary mixer.

2. The method of claim 1, wherein the mixed powder comprises the nickel-based superalloy powder in a range of 98 wt % to 99 wt % and the zirconia powder in a range of 1 wt % to 2 wt %.

3. The method of claim 1, wherein the first average particle size is in a range of 45 μm to 150 μm.

4. The method of claim 1, wherein the second average particle size is in a range of 20 nm to 200 nm.

5. The method of claim 1, wherein the nickel-based superalloy powder comprises Inconel 718 powder.

6. The method of claim 1, wherein the nickel-based superalloy powder comprises, based on a total weight of the nickel-based superalloy powder, 50 wt % to 55 wt % of nickel (Ni), 17 wt % to 21 wt % of chromium (Cr), 4.75 wt % to 5.50 wt % of niobium (Nb), 2.8 wt % to 3.30 wt % of molybdenum (Mo), 0.65 wt % to 1.15 wt % of titanium (Ti), 0.20 wt % to 0.80 wt % of aluminum (Al), 0.1 wt % to 1 wt % of cobalt (Co), and a remainder including iron and inevitable impurities.

7. The method of claim 6, wherein the nickel-based superalloy powder further comprises, based on a total weight of the nickel-based superalloy powder, at least one of equal to or less than 0.8 wt % of carbon (C), equal to or less than 0.35 wt % of manganese (Mn), equal to or less than 0.35 wt % of silicon (Si), equal to or less than 0.3 wt % copper (Cu), equal to or less than 0.015 wt % of phosphorus (P), and equal to or less than 0.015 wt % of sulfur(S).

8. The method of claim 1, wherein the mixed powder is formed by mixing the nickel-based superalloy powder and the zirconia powder at a mixing speed in a range of 600 RPM to 800 RPM for 1 to 10 minutes.

9. The method of claim 1, wherein the forming the nickel-based superalloy directed energy deposition structure is performed with a laser power in a range of 200 W to 350 W.

10. The method of claim 1, wherein the forming the nickel-based superalloy directed energy deposition structure is performed with a laser scan speed in a range of 600 mm/min to 1000 mm/min.

11. The method of claim 1, wherein the forming the nickel-based superalloy directed energy deposition structure is performed with a laser energy density in a range of 179 J/mm to 417 J/mm.

12. The method of claim 1, wherein the zirconia powder has an average particle size of 200 nm and a zirconia powder content is 2 wt %, wherein, in the forming the nickel-based superalloy directed energy deposition structure, a laser power of the laser is 250 W, and a laser scan speed of the laser is 1000 mm/min.

13. A zirconia contained nickel-based superalloy directed energy deposition structure, manufactured using the method according to claim 1, comprising:

a nickel-based superalloy in a range of 98 wt % to 99 wt %; and a zirconia in a range of 1 wt % to 2 wt %.

14. The zirconia contained nickel-based superalloy directed energy deposition structure of claim 13, wherein the zirconia contained nickel-based superalloy directed energy deposition structure has a porosity in a range of more than 0 vol % to equal to or less than 1.0 vol %.

15. The zirconia contained nickel-based superalloy directed energy deposition structure of claim 13, wherein the zirconia contained nickel-based superalloy directed energy deposition structure has a porosity in a range of more than 0 vol % to equal to or less than 0.6 vol %.

16. The zirconia contained nickel-based superalloy directed energy deposition structure of claim 13, wherein the zirconia contained nickel-based superalloy directed energy deposition structure has a Vickers hardness in a range of 220 Hv to 300 Hv.

17. The zirconia contained nickel-based superalloy directed energy deposition structure of claim 13, wherein the zirconia contained nickel-based superalloy directed energy deposition structure has a Vickers hardness in a range of 270 Hv to 300 Hv.

18. The zirconia contained nickel-based superalloy directed energy deposition structure of claim 13, wherein the zirconia contained nickel-based superalloy directed energy deposition structure comprises equiaxed grains having an average grain size in a range of 10 μm to 100 μm.

19. The zirconia contained nickel-based superalloy directed energy deposition structure of claim 13, wherein the zirconia contained nickel-based superalloy directed energy deposition structure comprises Al3Zr intermetallic compounds.

* * * * *